United States Patent
Nagumo

(10) Patent No.: US 8,441,289 B2
(45) Date of Patent: May 14, 2013

(54) DRIVING CIRCUIT, DRIVING DEVICE AND IMAGE FORMING DEVICE

(75) Inventor: Akira Nagumo, Tokyo (JP)

(73) Assignee: Oki Data Corporation, Tokyo (JP)

( * ) Notice: Subject to any disclaimer, the term of this patent is extended or adjusted under 35 U.S.C. 154(b) by 252 days.

(21) Appl. No.: 13/052,716

(22) Filed: Mar. 21, 2011

(65) Prior Publication Data
US 2011/0234741 A1   Sep. 29, 2011

(30) Foreign Application Priority Data
Mar. 26, 2010   (JP) ................................. 2010-071900

(51) Int. Cl.
*H03B 1/00*   (2006.01)
*H03K 3/00*   (2006.01)

(52) U.S. Cl.
USPC ........... 327/108; 327/109; 327/110; 327/111; 327/112

(58) Field of Classification Search .......... 327/108–112, 327/170, 389, 391; 326/22–27, 82, 83; 365/230.06
See application file for complete search history.

(56) References Cited

U.S. PATENT DOCUMENTS

| | | | | |
|---|---|---|---|---|
| 5,138,310 A | * | 8/1992 | Hirane et al. | 345/82 |
| 5,990,920 A | * | 11/1999 | Nagumo et al. | 347/237 |
| 6,172,701 B1 | * | 1/2001 | Tokura et al. | 347/237 |
| 6,683,638 B2 | * | 1/2004 | Sato | 347/238 |
| 7,142,227 B2 | * | 11/2006 | Omae | 347/132 |
| 8,164,944 B2 | * | 4/2012 | Nagumo | 365/154 |
| 8,305,415 B2 | * | 11/2012 | Ohno | 347/237 |
| 2007/0057259 A1 | | 3/2007 | Nagumo | |
| 2010/0097437 A1 | * | 4/2010 | Nagumo | 347/237 |
| 2011/0234734 A1 | * | 9/2011 | Nagumo | 347/132 |
| 2011/0234741 A1 | * | 9/2011 | Nagumo | 347/224 |
| 2011/0262184 A1 | * | 10/2011 | Nagumo | 399/177 |
| 2011/0285805 A1 | * | 11/2011 | Nagumo | 347/247 |
| 2012/0001996 A1 | * | 1/2012 | Nagumo | 347/224 |
| 2012/0251181 A1 | * | 10/2012 | Nagumo | 399/177 |

FOREIGN PATENT DOCUMENTS

| | | |
|---|---|---|
| JP | A-H09-109459 | 4/1997 |
| JP | A-2007-081081 | 3/2007 |

OTHER PUBLICATIONS

A.S. Grove, "Basic of Semiconductor Devices," (translated by Tarui et al.), published by Ohmsha, Ltd., pp. 256-260, Jun. 23, 1995 (revised 2007). (Discussed on p. 3 of the Specification).

* cited by examiner

*Primary Examiner* — Adam Houston
(74) *Attorney, Agent, or Firm* — Posz Law Group, PLC

(57) ABSTRACT

Each of a plurality of gate driving parts outputs a first potential (2 V) during a period in which the gates of a plurality of thyristors belonging to the corresponding set are driven (S1N=Low) and outputs a second potential (5 V) that is higher than the first potential at a rising part of the anode driving voltage during a period in which the gates of a plurality of thyristors belonging to the corresponding set are not driven (S1N=High). Each of a plurality of gate driving parts outputs a third potential (3 V) that is lower than the second potential at periods other than the rising part of the anode driving voltage during a period in which the gates of a plurality of thyristors belonging to the corresponding set are not driven (S1N=High).

19 Claims, 23 Drawing Sheets (Shift Resistor)

DRIVING CIRCUIT, DRIVING DEVICE AND IMAGE FORMING DEVICE

CROSS REFERENCE TO RELATED APPLICATION

The present application is related to, claims priority from and incorporates by reference Japanese Patent Application No. 2010-071900, filed on Mar. 26, 2010.

TECHNICAL FIELD

The present specification relates to a driving circuit, a driving device and an image forming device. In particular, the present specification relates to a driving circuit and device that selectively and cyclically drive a group of driven elements, such as an array of light emitting elements in an electrographic printer that uses a light emitting element array as a light source, and an array of display devices in a display apparatus.

BACKGROUND

Conventionally, there are image forming devices, such as electrographic printers, that include an exposure part configured from an array of a large number of light emitting elements. Light emitting diodes (LEDs), organic electroluminescent (EL) elements, light emitting thyristors and the like are used as the light emitting elements.

In such image forming devices using the light emitting thyristors, a driving circuit and the light emitting thyristor are provided at a ratio of 1:1 or 1:N (N>1). By passing electric current between an anode and a cathode of the LED, the light emitting state and non-light emitting state are switched.

The optical output of an LED in the light emitting state is determined by a value of the driving current. By adjusting the current, the amount of exposure energy to the exposure part is adjusted.

In addition, a configuration is known for the driving circuit, which has constant current characteristics by operating metal-oxide semiconductor (MOS) transistors in a saturation range and which drives the LEDs with a constant current.

The optical print head using the light emitting thyristors includes an anode driving circuit and a gate driving circuit inside the above-described driving circuit.

Japanese Laid-Open Patent Application Publication No. H09-109459 discloses N-gate light emitting thyristors formed by layering P and N-type semiconductors in a PNPN configuration. The light emitting thyristors include a P-type layer, which is the first, topmost layer, as an anode terminal, an N-type layer, which is the second layer, as a gate terminal, and an N-type layer, which is the fourth layer, as a cathode terminal. An optical print head driver integrated circuit (IC) for driving the light emitting thyristors includes an anode driving circuit and a gate driving circuit for driving the light emitting thyristors. A plurality of adjacent light emitting thyristors is grouped together. Anode terminals of the grouped thyristors are connected to each other. Gate terminals corresponding in different groups are connected to each other. The light emitting thyristors are driven by time division.

In the driving of the light emitting thyristors by time division, the gate terminal of a light emitting thyristor to emit light is at the low level (L level), and the gate terminal of a light emitting thyristor not to emit light is at the high level (H level). The driver IC for driving the light emitting thyristors is fabricated by using a complementary MOS (CMOS) process, which power source voltage is 5 V. In the gate driving circuit having a conventional configuration, the H level voltage is 5 V, which is approximately equivalent to the power source potential. The withstand voltage of the light emitting thyristors is only approximately 7 V, which is not enough for the power source voltage. As a result, the light emitting thyristor may be damaged by application of the H level voltage or may be degraded by application of the H level voltage for a long period of time.

This phenomenon is explained below. For example, the voltage is applied in a reverse direction between the N-type layer, which is the second layer, and the P-type layer, which is the third layer, of the light emitting thyristor when the thyristor does not emit light. The reverse breakdown voltage at the PN junction is known to be approximately 15 V.

The withstand voltage between the gate and cathode of the light emitting thyristor is determined based on the breakdown voltage. Considering an NPN bipolar transistor formed equivalently from an N-type layer, a P-type layer and an N-type layer, which are the second, third and fourth layers in a light emitting thyristor with a PNPN configuration, the withstand voltage between the gate and cathode of the light emitting thyristor is equivalent to the withstand voltage Vceo (max) between the collector and emitter of the NPN bipolar transistor with the open base terminal and is known to be given by the following equation according to "Basic of Semiconductor Devices" by A. S. Grove (translated by Tarui et al.), published by Ohmsha, Ltd., pp. 256-260:

$$Vceo(\max)=BV/(\beta)^{1/n}$$

where BV is the reverse breakdown voltage of the PN junction, $\beta$ is a current gain of the NPN bipolar transistor, and n is a constant determined by experiments, which is n=3 to 6.

As an example, with an assumption that an experimental value n is 6 (n=6) with a GaAs material, that the current gain is 50 ($\beta$=50), and that the reverse breakdown voltage BV at the PN junction is 15 V (BV=15), the withstand voltage Vceo (max) is calculated as follows:

$$Vcep(\max)=15/(50)^{1/6}=7.8\ V$$

This value is not considered to be large enough for the withstand voltage in consideration of the operation at 5 V, which is the normal power source voltage for the driving circuit. This value is not preferable because it may cause problems, such as damaging the element by breakdown voltage, degradation of the light emitting thyristor by a long continuous application of voltage at 5 V (e.g., fluctuation of light emission amount and decrease of switching speed due to the lower current gain).

As apparent from the above exemplary calculation, in order to increase the switching speed of the light emitting thyristor, it is necessary to increase the current gain of the bipolar transistors. To do so, the base width of the NPN transistors must be reduced, and the thickness of the third layer (P-type layer) in the light emitting thyristor with the PNPN configuration needs to be thin.

However, although the current gain of the NPN transistors can be increased, the withstand voltage Vceo (max) between the gate and cathode of the light emitting thyristor decreases as shown in the above-discussed equation. In contrast, if the thickness of the third layer (P-type layer) is increased in the light emitting thyristor with the PNPN configuration in order to increase the withstand voltage between the gate and cathode of the light emitting thyristor, the base width of the NPN transistor is increased. This is not preferable because the current gain $\beta$ is reduced and because the switching speed decreases.

As discussed above, the switching speed and the withstand voltage are contradictory from each other, and the withstand voltage cannot be simply increased. Therefore, solutions to these problems have been desired. In addition, similar problems occur when elements other than the light emitting thyristors, such as 3-terminal switching elements, are used.

SUMMARY

A driving circuit disclosed in the application includes: driven elements that form an array; and a driving element array that drives the driven elements. The driven elements are 3-terminal switching elements that include first, second and third terminals and control current passage between the first and second terminals by one of voltage applied to the third terminal and electric current flowing to the third terminal, the 3-terminal switching elements form a plurality of groups each being configured by a plurality of 3-terminal switching elements that are adjacently positioned, the first terminals belonging to a same group of the 3-terminal switching elements are connected to each other, a plurality of sets of the 3-terminal switching elements are respectively formed by corresponding ones of the 3-terminal switching elements belonging to different groups, and the third terminals of the 3-terminal switching elements belonging to a same set are connected to one of a plurality of common busses respectively provided for the plurality of sets via a respective electric connection unit, the second terminals of the 3-switching elements are connected to ground, the driving element array includes a plurality of first driving parts that are respectively provided to the plurality of groups and a plurality of second driving parts that are respectively provided to the plurality of sets, each of the plurality of the first driving parts drives the respective first terminals of the 3-terminal switching elements belonging to a corresponding group at a first timing different from first timings for the other first driving parts, each of the plurality of the second driving parts drives the respective third terminals of the 3-terminal switching elements of a corresponding set via a corresponding common bus and the corresponding electric connection unit, at a second timing different from second timings for the other second driving parts. Each of the plurality of second driving parts outputs: a first potential during a period to drive the respective third terminals of the 3-terminal switching elements belonging to the corresponding set, a second potential that is different from the first potential, at a beginning of the first timings at which the first terminals of the 3-terminal switching elements belonging to the corresponding group are driven by the respective first driving parts, when the respective third terminals of the 3-terminal switching elements belonging to the corresponding sets are not driven, and a third potential that is different from the first and second potentials, after the beginning of the first timings at which the first terminals of the 3-terminal switching elements belonging to the corresponding group are driven by the respective first driving parts, when the respective third terminals of the 3-terminal switching elements belonging to the corresponding sets are not driven.

According to the present embodiments, the plurality of the second driving parts outputs different potentials at the initial part of the timing, at which the first terminal is driven by the first driving part, and other timing, when the third terminal of the 3-terminal switching elements belonging to the same set are not driven (not turned on). Therefore, a potential sufficient to accurately maintain the 3-terminal switching elements in the OFF state can be applied, and the application of such a potential is not applied for a long period of time. Accordingly, degradation of the 3-terminal switching elements is prevented.

BRIEF DESCRIPTION OF THE DRAWINGS

FIG. 3A illustrates circuit symbols of the light emitting thyristor including an anode terminal, a cathode terminal and a gate terminal.

FIG. 13A illustrates circuit symbols for the buffer circuit, and FIG. 13B is a circuit diagram illustrating a circuitry of the buffer circuit.

FIG. 19A illustrates a symbol of a light emitting thyristor and voltage and current symbols at each terminal. FIG. 19B illustrates a part of the light emitting thyristor connected to the buffer circuit. FIGS. 19C-19E are waveform diagrams at various parts of the thyristor.

FIG. 22A illustrates circuit symbols for the buffer circuit, and FIG. 22B is a circuit diagram illustrating a circuitry of the buffer circuit.

DETAILED DESCRIPTIONS

In the below descriptions, a dot may refer to each element (each pixel) of an electrostatic latent image formed on a photosensitive drum by light emitted from each light emitting element or each element (each pixel) of a toner image that is formed after development or that is transferred onto a print medium. Similarly, a dot may refer to each light emitting element that corresponds to the respective dot. In addition, if positive or negative logic of a signal needs to be clarified, a signal name with "–P" at the end indicates a positive logic signal, and a signal name with "–N" at the end indicates a negative logic signal. Further, a signal and a terminal for inputting and outputting the signal may be referred to by the same symbol.

(First Embodiment: Configuration of printer controller) In an electrographic printer, an electrostatic latent image is formed by selectively irradiating light onto a charged photosensitive drum in accordance with print information. Then a toner image is formed by developing the electrostatic latent image by attaching toner thereto. The toner image is transferred onto and fused on a sheet.

Figure 1:
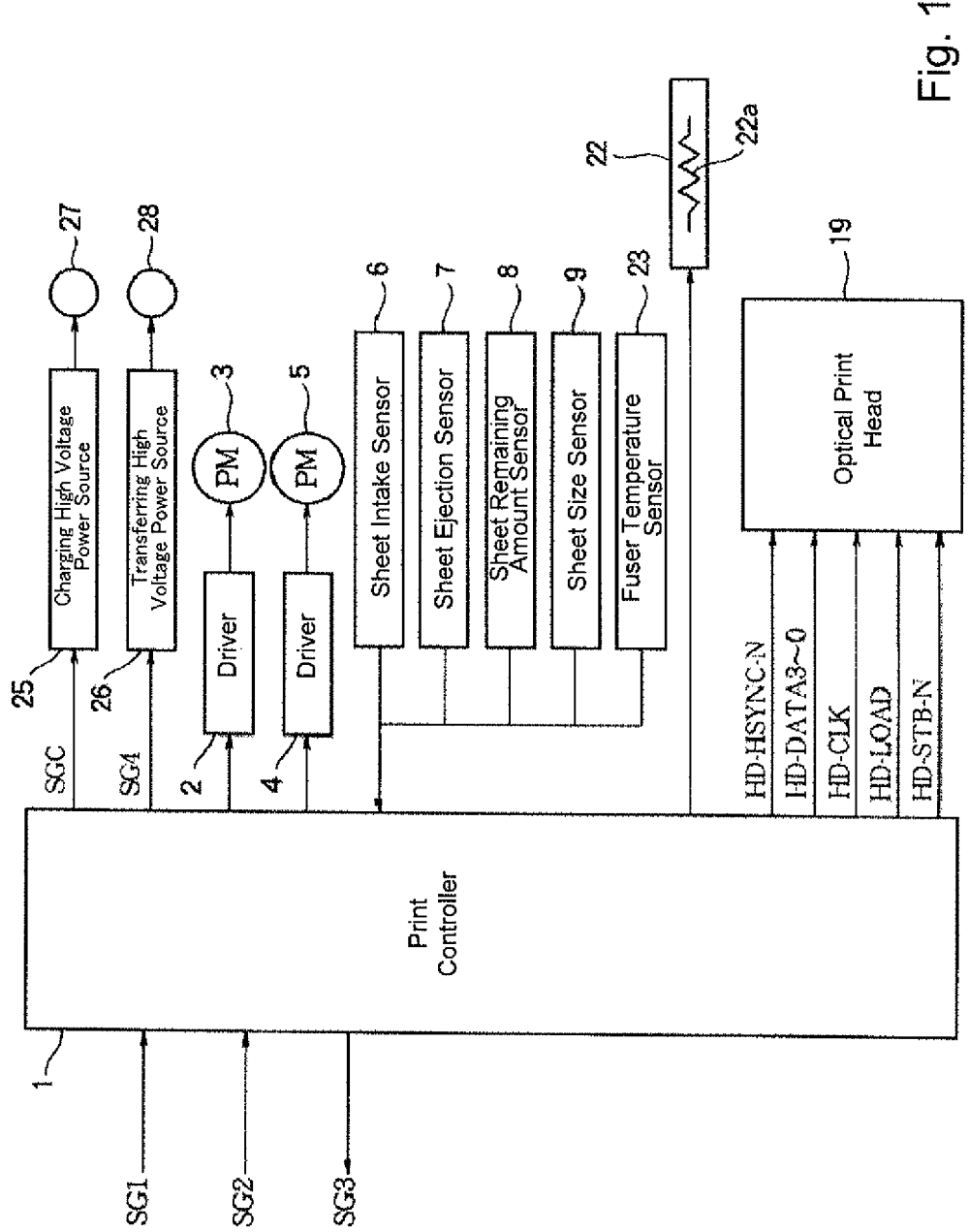
FIG. 1 is a block diagram of a printer control circuit when the present embodiments are implemented in an electrographic printer.

FIG. 1 is a block diagram of a printer control circuit when the present embodiments are implemented in an electrographic printer.

In FIG. 1, a print controller 1 is configured from a microprocessor, a read-only memory (ROM), a random access memory (RAM), an input/output port, a timer and the like and is provided inside a printing part of the printer. The print controller 1 controls the sequence of the entire printer using a control signal SG1 from an image processor (not shown), a video signal (one-dimensionally arrayed dot map data) SG2 and the like to perform the print operation.

When the print controller 1 receives a print instruction by the control signal SG1, the print controller 1 first determines by a fuser temperature sensor 23 whether a fuser 22 including a heater 22a is in a usable temperature range. If the fuser 22 is not in the temperature range, electricity is passed through the heater 22a to heat up the fuser 22 to the usable temperature. Next, a developing/transferring process motor (permanent magnet or PM) 3 is rotated via a driver 2. At the same time, a charging high voltage power source 25 is turned on by a charge signal SGC to charge the developing device 27.

Then, the presence and type of a sheet (not shown) are detected by a remaining sheet amount sensor 8 and a sheet size sensor 9, and the sheet feeding that is appropriate for the detected sheet is commenced. To a sheet feeding motor (PM) 5, a planetary gear mechanism is connected. The sheet feeding motor 5 is rotatable bidirectionally by a driver 4. By changing the rotational direction of the motor, different sheet feeding rollers inside the printer can be selectively driven.

At each time when the printing of one page is initiated, the sheet feeding motor (PM) 5 is first rotated in the reverse direction to feed the set sheet by a predetermined amount until a sheet intake sensor 6 detects the set sheet. Then, the sheet feeding motor 44 is rotated in the forward direction to carry the sheet into the print mechanism inside the printer.

When the sheet reaches a printable position, the print controller 1 transmits a timing signal SG3 (including a main-scanning synchronization signal and a sub-scanning synchronization signal) to the image processor (not shown) and receives the video signal SG2. The video signal SG2, which has been edited for each page by a host controller and which has been received by the print controller 1, is transmitted to each optical print head 19 as print data signals HD-DATA3 to 0. Each optical print head 19 includes a large number of light emitting thyristors that correspond to each print dot, which are positioned substantially linearly.

When the print controller 1 receives a video signal for one line, the print controller 1 transmits a latch signal HD-LOAD to the optical print head 19 and maintains the print data signals HD-DATA3 to 0 in the optical print head 19. In addition, the print controller 1 is able to perform the printing in accordance with the print data signals HD-DATA3 to 0 maintained in the optical print head 19 even while receiving the next video signal SG2 from the host controller. Moreover, a signal HD-CLK is a clock signal for transmitting the print data signals HD-DATA3 to 0 to the optical print head 19.

The transmission and receipt of the video signal SG2 are performed for each print line. The light from the optical print head 19 is emitted onto the photosensitive drum (not shown) that has been charged by negative potential. As a result the information to be printed is turned into a latent image formed by dots on the photosensitive drum with the raised potential. In addition, the image forming toner that is charged by the negative potential adheres to each dot by electric attraction at the developing part 27 to develop and form a toner image.

The toner image is sent to a transferring part 28 thereafter. A transferring high voltage power source 26 for the positive potential is turned on by a transferring signal SG4, and the transferring part 28 transfers the toner image onto the sheet that passes between the photosensitive drum and the transferring part 28.

The sheet with the transferred toner image is carried as it contacts the fuser 22 including the heater 22a. The toner image is fused on the sheet by the heat of the fuser 22. The sheet with the fused image is further carried and ejected from the print mechanism and outside the printer after passing a sheet ejection sensor 7.

In response to the detection of the sheet by the sheet size sensor 9 and the sheet intake sensor 6, the print controller 1 applies voltage from the transferring high voltage power source 26 to the transferring part 28 only while the sheet is passing the transferring part 28. When the sheet passes the sheet ejection sensor 7 after the printing, the application of the voltage to the developing part 27 by the charging high voltage power source 25 is ended, and at the same time, the rotation of the developing/transferring process motor 3 is stopped. The above-described operations are repeated thereafter.

Figure 2:
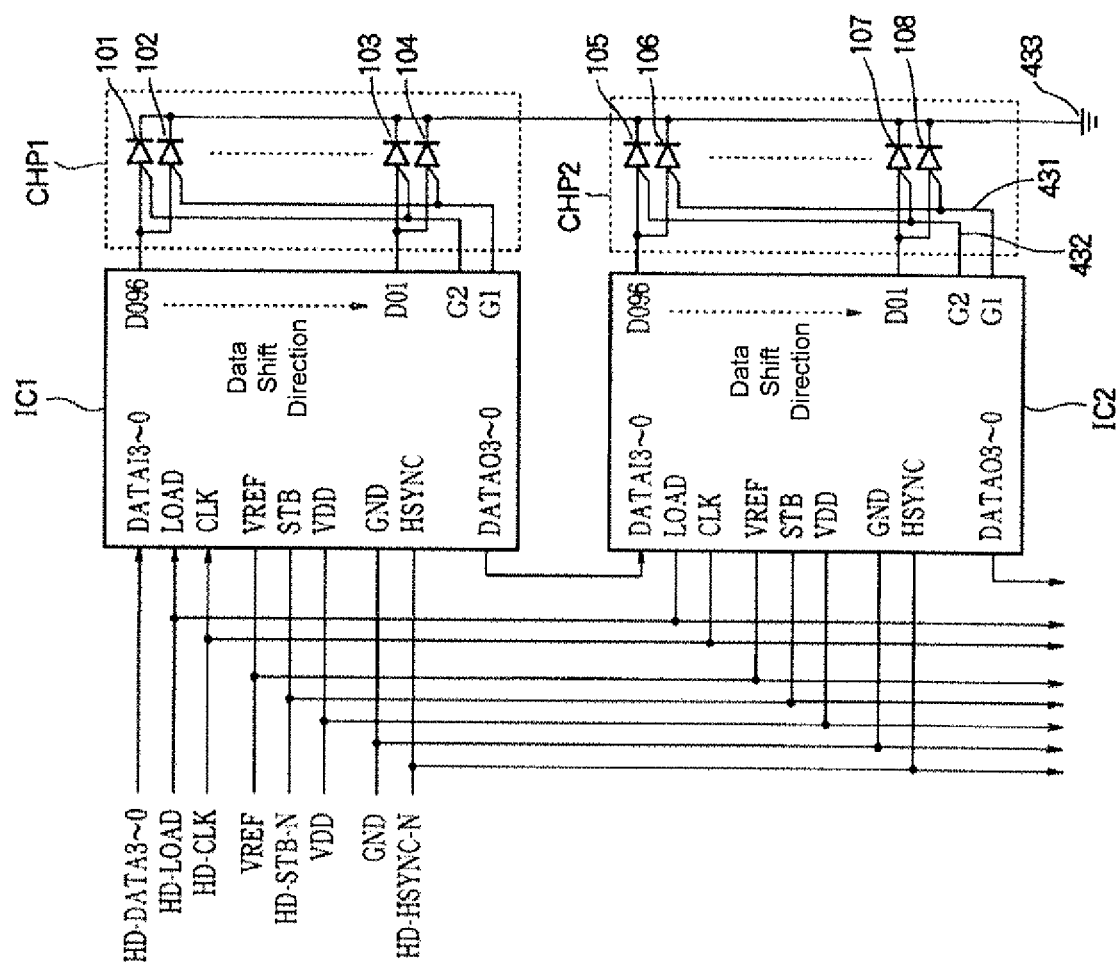
FIG. 2 is a block diagram illustrating a configuration of an optical print head in which the present embodiments are implemented.

(Configuration of Optical Print Head) Next, the optical print head 19 is described. FIG. 2 is a block diagram illustrating a part of a configuration of the optical print head, in which the present embodiment is implemented.

In the description of the present embodiment, a detailed configuration of an optical print head that can print an A4-size sheet at a 600 dot-per-inch (dpi) resolution is discussed as an example.

In the present embodiment, a total of 4,992 light emitting thyristors (hereinafter "thyristors") are used as light emitting elements. To form the thyristors, thyristor array chips are provided, each including 192 thyristor elements arranged thereon in an array, and 26 driver integrated circuits (ICs), on which the thyristor array chips are attached, are provided on a printed circuit board (not shown). Of the 26 driver ICs and the 26 thyristor array chips, only two of each of the driver ICs and the thyristor array chips, that is, driver ICs IC1 and IC2 and thyristors array chips CHP1 and CHP2 (each surrounded by lines) are shown in FIG. 2.

Each thyristor array chip includes 192 thyristors elements arrayed thereon. A cathode terminal of each thyristor is connected to ground. A group is formed by a plurality of thyristors adjacent to each other, such as two thyristors adjacent to each other (e.g., thyristors 101 and 102, and 103 and 104, etc.). Anode terminals of the thyristors in the same group are connected to each other and are connected to one of driving output terminals (D096, D001, etc.) of the driver IC that correspond in each group, by a method such as thin film wiring.

Each of the driver ICs IC1, IC2 and the like, which drive the thyristor arrays CHP1, CHP2 and the like, is configured by the same circuit and is connected to adjacent driver ICs in a cascade form.

A total of 192 thyristor elements are provided on each thyristor array (CHP1, CHP2, etc.) (only thyristor elements 101-108 are shown in FIG. 2) and are arranged to form an array.

In the configuration shown in FIG. 2, the print data is time-divided into two sets, transferred and driven. For example, one set (first set) is configured from odd-number thyristors (thyristors 104, 102, etc.) of the adjacent thyristors as counted from one end (lower end in FIG. 2) of the array, and another set (second set) is configured from even-number thyristors (thyristors 103, 101, etc.). The data is simultaneously transmitted to the thyristors of the first set to drive for printing, and then the data is subsequently simultaneously transmitted to the thyristors of the second set to drive for printing. This operation is repeated. That is, the first set and the second set are driven by time division.

In FIG. 2, the print data signals (HD-DATA3 to 0), which are supplied through four signal lines, are supplied to the driver ICs IC1, IC2 and the like that are connected in cascade form (inputted from one end of the cascade connection). Among the adjacent eight thyristor elements (eight pixels), data for four pixels formed by the odd-number or even-number thyristors is simultaneously transmitted at each clock signal. Therefore, the print data signals HD-DATA3 to 0 that are outputted from the print controller 1 are inputted to the optical print head 19 with the clock signal HD-CLK. Of the bit data for the 4,992 dots, the data for the odd-number dots and the data for the even-number dots are sequentially transmitted through shift resistors formed from the later-discussed flip flop circuits.

Next, the latch signal HD-LOAD is inputted to the optical print head 19, and the bit data is latched by latch circuits provided in correspondence with the flip flop circuits. Then, when a print drive signal (strobe signal) HD-STB-N is inputted, the thyristor elements that correspond to the dot data, in which the print data is at a high (H) level, are turned on. A symbol VDD is a power source, and a symbol GND is ground. A symbol HD-HSYNC-N is a synchronization signal for setting an initial state that indicates whether the odd-number or even number thyristors are to be driven by the above-described time division. A symbol VREF is a reference voltage for instructing a driving current value for driving the thyristors, which is generated by a reference voltage generation circuit (not shown) provided in the optical print head.

Furthermore, as discussed in detail below, the driver ICs (IC1-IC26) each include the later-discussed anode driving circuit (anode driving part), gate driving circuit (gate driving part) and control voltage generation circuit that generates a command voltage to the anode driving circuit to maintain the driving current constant. The reference voltage inputted to the control voltage generation circuit is referenced as VREF or Vref.

Moreover, the driver ICs (IC1-C26) each include date driving terminals G1 and G2 for driving gates of the thyristors. The terminal G1 is connected to the gate terminals of the odd-number thyristors (104, 102, etc.), and the terminal G2 is connected to the gate terminals of the even-number thyristors (103, 101, etc.)

The gate terminals of the odd-number thyristors are connected to a common bus (first common bus) 431, and the gate terminals of the even-number thyristors are connected to another common bus (second common bus) 432. The cathode terminals of the entire thyristors are connected to a third common bus 433.

In FIG. 2, the common buses 431 and 432 are illustrated as if they are inside the thyristor arrays CHP1, CHP2 and the like. However, this is due to space constraints in the drawing, and it is preferable that the common buses 431 and 432 are provided inside the driver ICs (IC1-C26) in advance.

As discussed below, after attaching a thyristor array (CHP1 etc.) on a driver IC to form light emitting elements, the thyristors array and the driver IC are connected by thin film wiring. By doing so, crossing of the anode wiring and the gate wiring for the thyristors is prevented in the thin film wiring between the driver IC and the thyristor array, and the wiring may be provided in a single layer. Therefore, there is an advantage to simplify a process required for forming the wiring.

Similarly, it is preferable that the common wiring 433 for the cathode of the thyristors shown in FIG. 2 is also provided on the driver IC. In that case, it is preferable that the common wiring 433 and a ground pad (GND) of the driver IC are connected in advance in the fabrication process of the driver IC and are connected to a wiring pad of a printed wiring board (not shown) by bonding wire via a ground terminal pad (GND) on the driver.

As apparent in FIG. 2, a large number of thyristor arrays are mounted on the optical print head 19. If the characteristics of each element vary due to the semiconductor fabrication process, the emission power becomes uneven between each of the thyristor arrays as well as between each of the dots in the same thyristor array, resulting in variant amounts of exposure energy on the photosensitive drum.

This type of phenomenon appears as variation of dot areas when developing the photosensitive drum, which is undesirable because it causes uneven print density. Because of this, the driving current for each dot of the thyristor is normally adjusted so that the emission power becomes constant. As discussed blow, circuitry for this reason is included in the driver ICs IC1-IC26 shown in FIG. 2.

In FIG. 2, the gate terminals of the plurality of thyristors are connected to the common buses 431 and 432, and the common buses 431 and 432 are connected to the gate driving terminal outputs G1 and G2, respectively. However, it is possible to connect the common buses 431 and 432 and the gate terminal of each thyristor via an electric connection unit. The electric connection unit includes, for example, wiring by a simple conductor, connection means with a resistor or a buffer circuit for the purpose of preventing electric interference between the thyristors, and diode circuits that are connected in parallel in opposite directions.

Figures 3A, 3B:
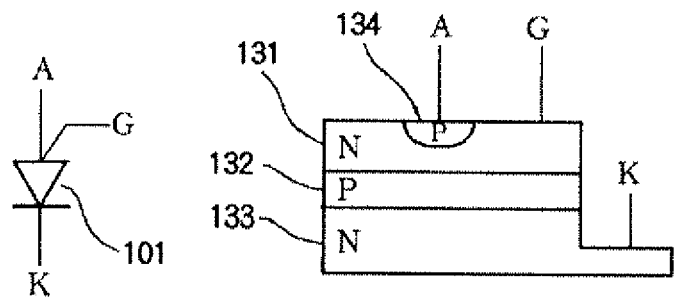
FIGS. 3A-3D schematically illustrate a configuration of light emitting thyristors shown in FIG. 2.

(Configuration of Light Emitting Thyristors) FIGS. 3A-3D schematically illustrate a configuration of the light emitting thyristor (101-108) shown in FIG. 2. FIG. 3A shows circuit symbols. The light emitting thyristor 101 includes an anode A, a cathode K and a gate G.

FIG. 3B illustrates a cross-sectional configuration of the light emitting thyristor shown in FIG. 3A. The light emitting thyristor shown in FIG. 3B is fabricated by using a GaAs wafer substrate, for example, and by epitaxially growing predetermined crystals on the GaAs wafer substrate by a known metal organic-chemical vapor deposition (MO-CVD) method.

First, a three-layer wafer with an NPN configuration is formed by sequentially layering an N-type layer (N-type region) 133, a P-type layer (P-type region) 132 and an N-type layer (N-type region) 133, after epitaxially growing the predetermined buffer layer and sacrifice layer (not shown). In the N-type layer 133, an N-type impurity is contained in an AlGaAs material. The P-type layer 132 is formed to contain a P-type impurity. The N-type layer 131 is formed to contain an N-type impurity.

Next, using a known photolithographic method, a P-type impurity region 134 is selectively formed at a part of the topmost N-type layer.

Further, using a known dry etching method, element isolation is performed by forming a trench. In addition, a part of the N-type layer, which is the bottom layer of the light emitting thyristor, is exposed during the etching process, and metal wiring is formed in that region to form the cathode electrode (K). At the same time, the anode electrode (A) and the gate electrode (G) are also formed in the P-type region 134 and the N-type region 131, respectively.

Figures 3C, 3D:
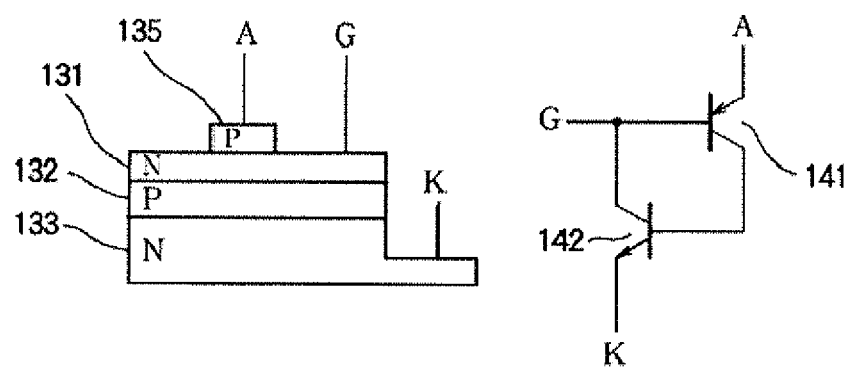

FIG. 3C is a cross-sectional configuration diagram that illustrates another form of the light emitting thyristor. In this configuration, the light emitting thyristor is fabricated by using a GaAs wafer substrate, for example, and by epitaxially growing predetermined crystals on the wafer substrate by a known MO-CVD method. First, a four-layer wafer with a PNPN configuration is formed by sequentially layering the N-type layer 133, the P-type layer 132, the N-type layer 131 and a P-type layer 135, after epitaxially growing the predetermined buffer layer and sacrifice layer (not shown). In the N-type layer 133, an N-type impurity is contained in the AlGaAs material. The P-type layer 132 is formed to contain a P-type impurity. The N-type layer 131 is formed to contain an N-type impurity. The P-type layer 135 is formed to contain a P-type impurity.

Further, using a known dry etching method, element isolation is performed by forming a trench. In addition, a part of the N-type layer, which is the bottom layer of the light emitting thyristor, is exposed during the etching process, and metal wiring is formed in the exposed region to form the cathode electrode (K). Similarly, a part of the P-type region, which is the top layer, is exposed, and metal wiring is formed in the exposed region to form the anode electrode (A). At the same time, the gate electrode (G) is formed in the P-type region 131.

FIG. 3D is a representative circuit schematic of the light emitting thyristor in contrast with FIGS. 3B and 3C. The light emitting thyristor is formed from a PNP transistor 141 and an NPN transistor 142. The emitter of the PNP transistor 141 corresponds to the anode terminal A of the thyristor. The base of the PNP transistor 141 corresponds to the gate terminal G of the thyristor. The gate terminal G is also connected to the collector of the NPN transistor 142. In addition, the collector of the PNP transistor 141 is connected to the base of the NPN transistor 142, and the emitter of the NPN transistor 142 corresponds to the cathode terminal K of the thyristor.

The thyristor shown in FIGS. 3A-3D is configured by forming the AlGaAs layer on the GaAs wafer substrate. However, the thyristor is not limited to this configuration, but a material, such as GaP, GaAsP or AlGaInP, may be used. Moreover, the thyristor may be configured by forming a material, such as GaN, AlGaN or InGaN, on a sapphire substrate.

The above-described thyristor element is adhered to a wafer on which the driver circuit IC (as illustrated as IC1-IC26 in FIG. 26) using the epitaxial bonding disclosed in Japanese Laid-Open Patent Application Publication No. 2007-81081, for example. Unnecessary parts are removed, and terminals of the thyristor element are exposed by known etching.

Next, parts of the thyristor are designated for forming each terminal and terminal parts of the driver IC are connected using thin film wiring formed by a lithography method. In addition, by separating the driver IC into a plurality of chips using a known dicing method, composite chips configured from light emitting elements and driving elements are formed.

Figure 4:
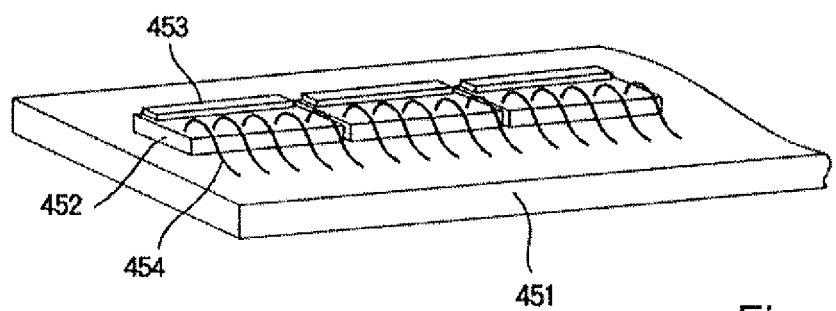
FIG. 4 is a perspective view of a substrate unit of the optical print head, which is configured by arranging thereon composite chips composed by the light emitting elements and driving elements.

(Perspective View of Head Substrate Unit) FIG. 4 is a perspective view of an optical print head substrate unit, which is configured by arranging composite chips composed by the above-described light emitting elements and driving elements on a printed wiring board. In FIG. 4, the reference numeral 451 indicates a printed wiring board. The reference numeral 452 indicates an IC chip (IC1-IC26 etc.) shown in FIG. 3. The reference numeral 453 indicates a thyristor array (CHP1-CHP26 etc.) arranged on the IC chip 452. A composite chip composed from the light emitting elements and driving elements is formed from the IC chip 452 and the thyristor array 453 by connecting the IC chip 452 and the thyristor array 453 using thin film wiring (not shown).

Each terminal of the driver IC (IC1 etc.) and the cathode terminals of the thyristors are connected to a wiring pad (not shown) on the print wiring board 451 by bonding wires 454.

Figure 5:
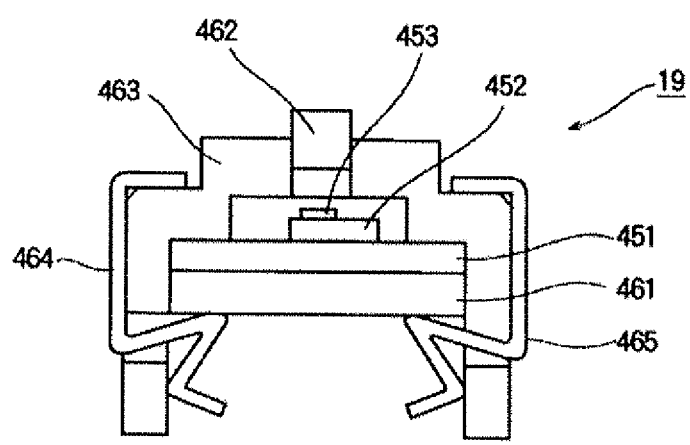
FIG. 5 is a cross-sectional view schematically illustrating a configuration of the optical print head.

(Cross-Sectional View of Head) FIG. 5 is a cross-sectional view schematically showing a configuration of the optical print head 19. As shown in FIG. 5, the optical print head 19 is configured from a base member 461, the printed wiring board 451 fixed to the base member 461, a rod lens array 462 on which a large number of pillar-shaped optical elements are arranged, a holder 463 that holds the rod lens array 462, cramp members 464 and 465 that fix the print wiring board 451, the base member 461 and the holder 463. The reference numeral 452 indicates an IC chip in which the above-described driving circuits and the like are integrated. The reference numeral 453 indicates a thyristor array arranged on the IC chip.

Figure 6:
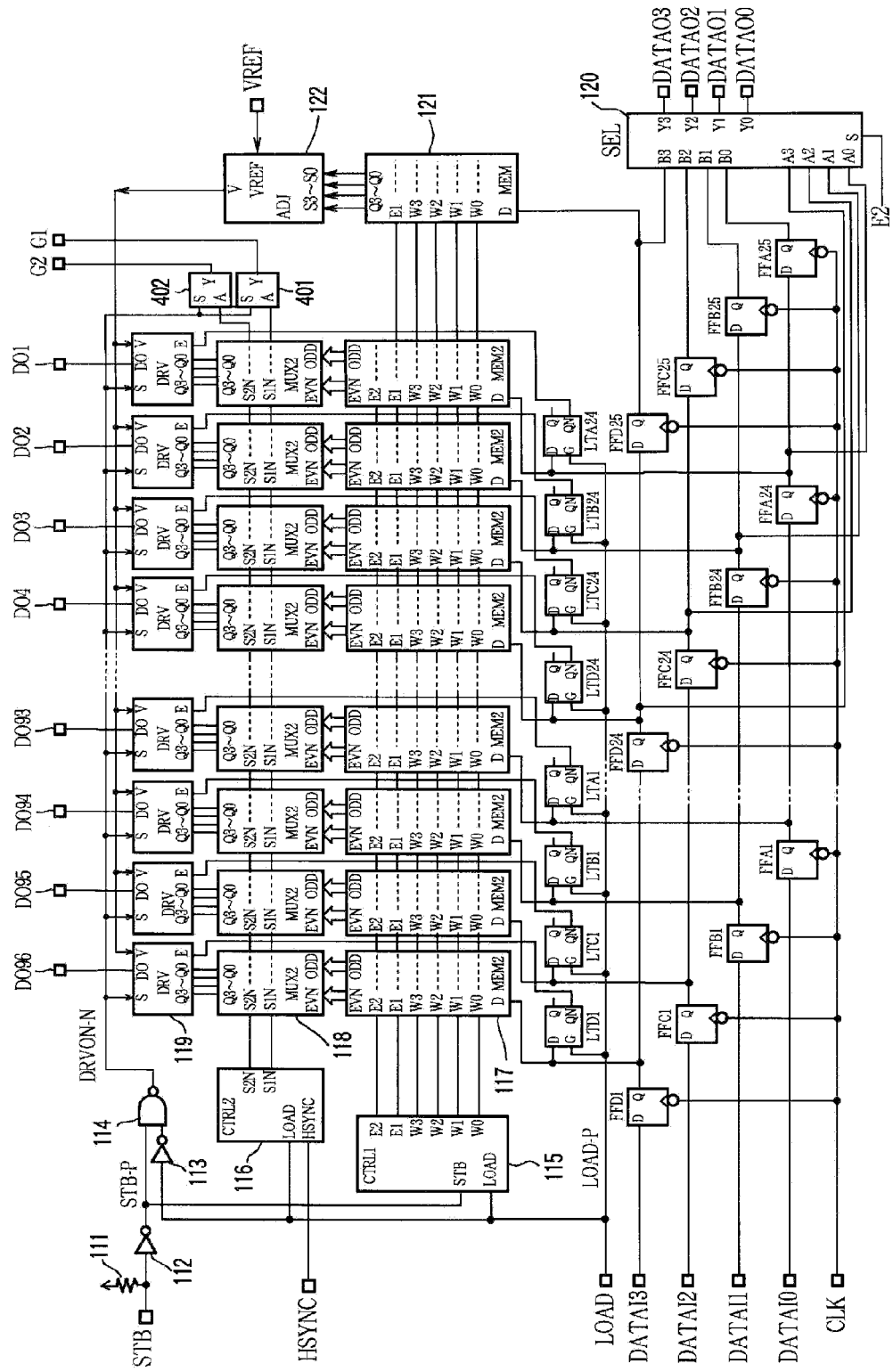
FIG. 6 is a circuit diagram illustrating an exemplary configuration of a driver IC shown in FIG. 2.

(Block Diagram of Driver IC) FIG. 6 illustrates an exemplary configuration of the driver IC shown in FIG. 2. A pull-up resistor 111 is connected between a strobe terminal (STB) and a power source VDD. The reference numeral 112 and 113 indicate inverter circuits, and the reference numeral 114 indicates an NAND circuit.

Symbols FFA1-FFA25, FFB1-FFB25, FFC1-FFC25, and FFD1-FFD25 are flip flop circuits, which form a shift resistor. Symbols LTA1-LTD1, . . . , LTA24-LTD24 are latch elements, which form a latch circuit. In FIG. 6, correction data (dot correction data) for correcting fluctuations of light amount of thyristors, light amount correction data (chip correction data) for each thyristor array, or data specific for each driver IC is stored in correction memory circuits (MEM2 block) 117 and a correction memory circuit (MEM block) 121.

A multiplexer circuit (MUX2 block) 118 is provided for switching, for the dot correction data outputted from the correction memory circuit (MEM2) 117, between correction data for odd-number dots and correction data for even-number dots among the adjacent light emitting element dots. The reference numeral 119 indicates an anode driving circuit (DRV block), and the reference numeral 120 indicates a selector circuit (SEL block). A memory control circuit (CTRL1 block) 115 generates a writing command signals (E1, E2, W3-W0) when the correction data is written in the correction memory circuit (MEM2) 117. A multiplexer control circuit (CTRL2 block) 116 generates data selection signals S1N and S2N for selection of the correction data for the odd-number dots and the correction data for the even-number dots at the multiplexer circuit (MUX2) 118. The data selection signals S1N and S2N are also called set selection signals as they are for selecting the above-described sets of thyristors (configured from thyristors, which gate terminals are connected to the common bus 431 or 432).

The data selection signals S1N and S2N are also connected to input terminals A of the buffer circuits 401 and 402. Input terminals S of the buffer circuits 401 and 402 are connected to the output of the NAND circuit 114. Output terminals Y of the buffer circuits 401 and 402 are connected to the above-described terminals G1 and G2, respectively, of the driver IC and are connected to the gate terminals of the thyristors 102, 101 and the like shown in FIG. 2.

A control voltage generation circuit (ADJ block) 122 receives a reference voltage value Vref inputted from the terminal VREF and generates control voltage V for driving anode. The reference voltage value Vref is generated from a regulator circuit or the like (not shown). Even when the power source voltage momentarily drops, such as when all of the thyristors are turned on, the reference voltage Vref can be maintained at a predetermined value, so that decrease in the anode current does not occur.

The flip flop circuits FFA1-FFA25 are connected in a cascade. A data input terminal DATAI0 of the driver IC is connected to a data input terminal D of the flip flop circuit FFA1. Data outputted from the flip flop circuits FFA24 and FFA25 are inputted to a selector circuit (SEL) 120. An output terminal Y0 of the selector (SEL) circuit 120 is connected to a data output terminal DATAO0 of the driver IC. Similarly, the flip flop circuits FFB1-FFB25, FFC1-FFC25 and FFD1-FFD25 are connected in a cascade. Data input terminals DATAI1, DATAI2 and DATAI3 of the driver IC are connected to data input terminals D of the flip flop circuits FFB1, FFC1 and FFD1, respectively.

Output terminals of the flip flop circuits FFB24 and FFB25, FFC24 and FFC25, and FFD24 and FFD25 are also connected to the selector circuit (SEL) 120. The output terminals are respectively connected to data output terminals DATAO1, DATAO2 and DATAO3. Therefore, each set of the flip flop circuits FFA1-FFA25, FFB1-FFB25, FFC1-FFC25 and FFD1-FFD25 configures a 25-stage shift resistor circuit. The number of shift stages of a shift resistor may be switched between 24 and 25 by the selector circuit (SEL) 120.

As a result, the data output terminals DATAO0-DATAO3 of the driver IC are respectively connected to the data input terminals DATAI0-DATAI3 of the driver IC of the next stage. Therefore, the shift resistor configured by all of the driver ICs IC1-IC26 configures a 24×26 or 25×26 stage shift resistor circuit that shifts the data signals HD-DATA3-0 inputted to the first-stage driver IC IC1 by synchronizing with the clock signal.

The negative-logic strobe signal HD-STB-N inputted to the strobe terminal STB is turned to a signal STB-P by being inverted to a positive logic via the inverter circuit 112 and is connected to one of the input terminals of the NAND circuit 114. In addition, a latch signal LOAD-P inputted from the load terminal LOAD is transmitted to the other one of the input terminal of the NAND circuit 114 via the inverter circuit 113. Therefore, a signal DRVON-P that controls the ON/OFF operation of a thyristor is generated for the anode driving circuit (DRY) 119.

Figure 7:
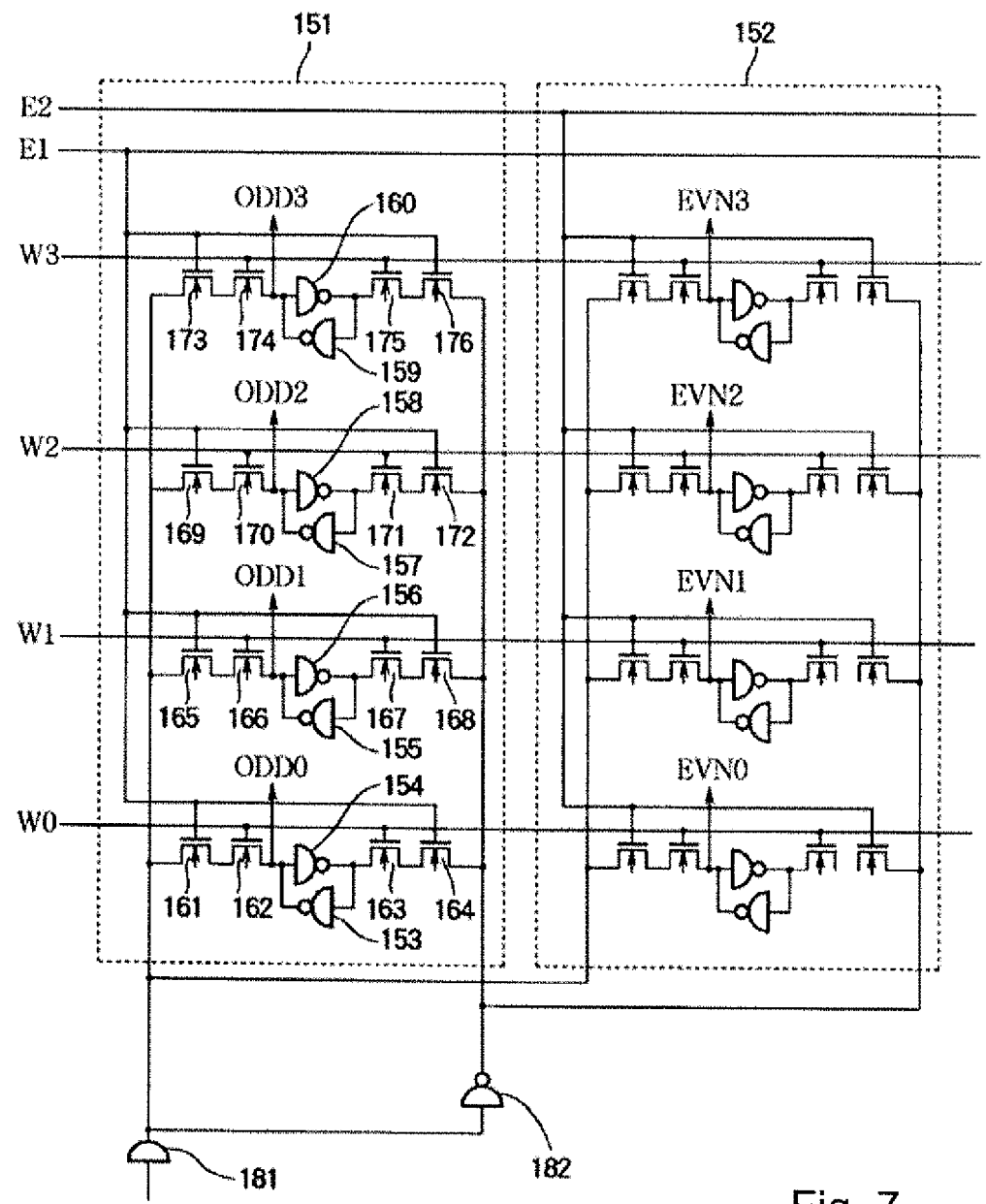
FIG. 7 is a circuit diagram illustrating an exemplary configuration of a compensating memory circuit (MEM2) shown in FIG. 6.

(Configuration of Correction Memory Circuit (MEM2) 117) FIG. 7 illustrates an exemplary configuration of the correction memory circuit (MEM2) 117 shown in FIG. 6. In the configuration according to the present embodiment, the dot correction data for correcting the light amount of the light emitting element is 4-bit data. The light amount is corrected by adjusting the driving current in 16 levels for each dot.

Two adjacent memory cell circuits (for two dots) are shown in FIG. 7 and are segmented into regions 151 and 152 each surrounded by broken lines. The circuit 151 on the left stores correction data for the odd-number dot (e.g., dot #1), and the circuit 152 on the right stores correction data for the even-number dot (e.g., dot #2). The correction memory circuit (MEM2) 117 includes a buffer circuit 181, an inverter 182 provided for generating data signal that complements the data signal of the buffer circuit 181, inverters 153-160 and N-channel metal-oxide semiconductor (NMOS) transistors 161-176 which form correction memory cells.

In addition, the correction memory circuit (MEM2) 117 includes a correction data input terminal D, an enable signal line E1 that transmits a signal that allows writing data on the odd-number dot side, an enable signal line E2 that transmits a signal that allows writing data on the even-number dot side, memory cell selection terminals W0-W3, correction data output terminals ODD0-ODD3 for odd-number dots, and correction data output terminals EVN0-EVN3 for the even-number dots.

The data input terminal D of the correction memory circuit (MEM2) 117 shown in FIG. 7 is connected to each of data output terminals Q of the flip flop circuits FFA1, FFB1, FFC1, FFD1, . . . , FFA24, FB24, FFC24, FFD24 and the like shown in FIG. 6. In addition, to the memory cell selection terminals W0-W3, writing control signals W0-W3 are supplied from the memory control circuit (CTRL1) 115. To the writing enable terminals E1 and E2 of the correction memory circuit (MEM2) 117, the writing enable signals E1 and E2 are supplied from the memory control circuit (CTRL1) 115.

The input terminal of the buffer circuit 181 is the correction data input terminal D. The output terminal of the buffer circuit 181 is connected to first terminals of the NMOS transistors 161, 165, 169 and 173. The input terminal of the inverter 182 is connected to the output of the buffer circuit 181. The output of the inverter 182 is connected to first terminals of the NMOS transistors 164, 168, 172 and 176.

The inverters 153 and 154, the inverters 155 and 156, the inverters 157 and 158, and the inverters 159 and 160 are cross-connected with each other (the input of one of the inverters is connected to the output of the other inverter) and each form a memory cell. The NMOS transistors 161 and 162, the NMOS transistors 163 and 164, the NMOS transistors 165 and 166, the NMOS transistors 167 and 168, the NMOS transistors 169 and 170, the NMOS transistors 171 and 172, the NMOS transistors 173 and 174, and the NMOS transistors 175 and 175 are each connected serially. One end of the serial connection is connected to the output of the inverter 181 or 182.

Gate terminals of the NMOS transistors 162 and 163 are connected to the terminal W0. Gate terminals of the NMOS transistors 166 and 167 are connected to the terminal W1. Gate terminals of the NMOS transistors 170 and 171 are connected to the terminal W2. Gate terminals of the NMOS transistors 174 and 175 are connected to the terminal W3. The enable signal line E1 is connected to the gate terminal of the NMOS transistors 161, 164, 165, 168, 169, 172 and 176.

The output of the inverter 153 is connected to the terminal ODD0. The output of inverter 155 is connected to the terminal ODD2. The output of the inverter 159 is connected to the terminal ODD3.

The memory cell 151 is described above. The memory cell 152 has the same configuration with exception that the enable signal line E2 is connected to the memory cell 152 and that the signals EVN0-EVN3 are outputted from the memory cell 152.

Moreover, the correction memory circuit (MEM) 121 also includes the same configuration as the memory cell 151 shown in FIG. 7.

Figure 8:
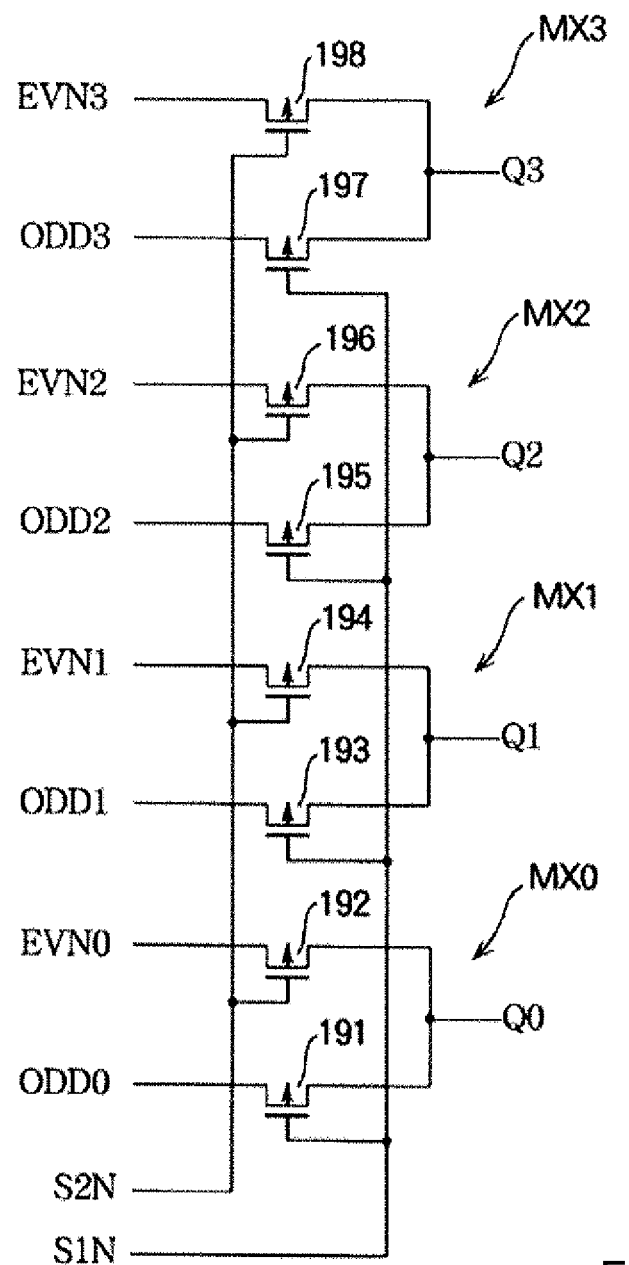
FIG. 8 is a circuit diagram illustrating an exemplary configuration of a multiplexer circuit (MUX2 block) shown in FIG. 6.

(Multiplexer circuit (MUX2) 118) FIG. 8 illustrates an exemplary configuration of the multiplexer circuit (MUX2) 118 shown in FIG. 6. The multiplexer circuit (MUX2) 118 shown in FIG. 8 is configured from four independent multiplexers MX0-MX3. The multiplexer MX0 is configured from P-channel MOS (PMOS) transistors 191 and 192. The multiplexer MX1 is configured from PMOS transistors 193 and 194. The multiplexer MX2 is configured from PMOS transistors 195 and 196. The multiplexer MX3 is configured from PMOS transistors 197 and 198. Gates of the PMOS transistors 191, 193, 195 and 197 are connected to a data selection terminal S1N. Gates of the PMOS transistors 192, 194, 196 and 197 are connected to a data selection terminal S2N. The first terminal of the PMOS transistor 191 of the multiplexer MX0 is connected to the ODD0 terminal. The first terminal of the PMOS transistor 192 is connected to the EVN0 terminal. The second terminals of the PMOS transistors 191 and 192 are connected to a terminal Q0.

Other multiplexers MX1-MX3 include the same configuration. The first terminal of the PMOS transistor 193 is connected to the ODD1 terminal. The first terminal of the PMOS transistor 194 is connected to the EVN1 terminal. The second terminals of the PMOS transistors 193 and 194 are connected to a terminal Q1. The first terminal of the PMOS transistor 195 is connected to the ODD2 terminal. The first terminal of the PMOS transistor 196 is connected to the EVN2 terminal. The second terminals of the PMOS transistors 195 and 196 are connected to a terminal Q2. The first terminal of the PMOS transistor 197 is connected to the ODD3 terminal. The first terminal of the PMOS transistor 198 is connected to the EVN3 terminal. The second terminals of the PMOS transistors 197 and 198 are connected to a terminal Q3.

In the configuration of the above-described multiplexer circuits, the reasons for using PMOS transistors as switching elements are as follows. The circuit provides a new configuration that allows reducing the number of elements used while preventing problems in operation.

That is, when the data selection signal S1N falls to the low (L) level to turn on the PMOS transistor 191, if the signal ODD0 is at the H level, voltage approximately equivalent to that signal level is outputted from the terminal Q0. The transmission of the H level signal does not cause a problem even if the PMOS transistors are used as switching elements. In contrast, when the signal ODD0 is at the L level (approximately 0 V), the second terminal of the PMOS transistor 191 does not fall to the L level (approximately 0 V) although the second terminal of the PMOS transistor 191 falls to the potential close to the threshold voltage of the PMOS.

As described above, there is an inherent disadvantage that the function to transmit the L level signal is not perfect. To overcome such a disadvantage, the conventional configuration includes an analog switch formed by connecting an NMOS transistor in parallel with a PMOS transistor as switching means for data selection. In this configuration, output voltage that is approximately equivalent to the potential of the input signal to be transmitted can be obtained, and thus, there is no difference between the input potential and the output potential caused by the intervening switching means.

On the other hand, it is necessary to provide a pair of the PMOS and NMOS transistors for each data signal. Therefore, there is a problem that the number of elements increases twice compared with the configuration shown in FIG. 8 and that a large chip area is required for an IC to include the elements.

In contrast, with the configuration shown in FIG. 8, there is an advantage that the number of elements is reduced by half compared with the circuit with a configuration using the analog switch. However, there is a disadvantage that the transmission function for the L level signal is not perfect. Nonetheless, as discussed below, the anode driving circuit (DRV) 119, which is a subsequent stage circuit to which the output of the multiplex circuit (MUX2) 118 is connected, requires input voltage that is approximately equivalent to the VDD potential as the H level signal. In contrast, it is sufficient if the L level potential falls to a potential Vcontrol, as discussed below. Therefore, the L level potential that falls to approximately 0 V is not required. As a result, the multiplexer circuit shown in FIG. 8 can be used, thereby allowing the number of required elements to decrease while avoiding restrictions in circuit operations.

Figure 9:
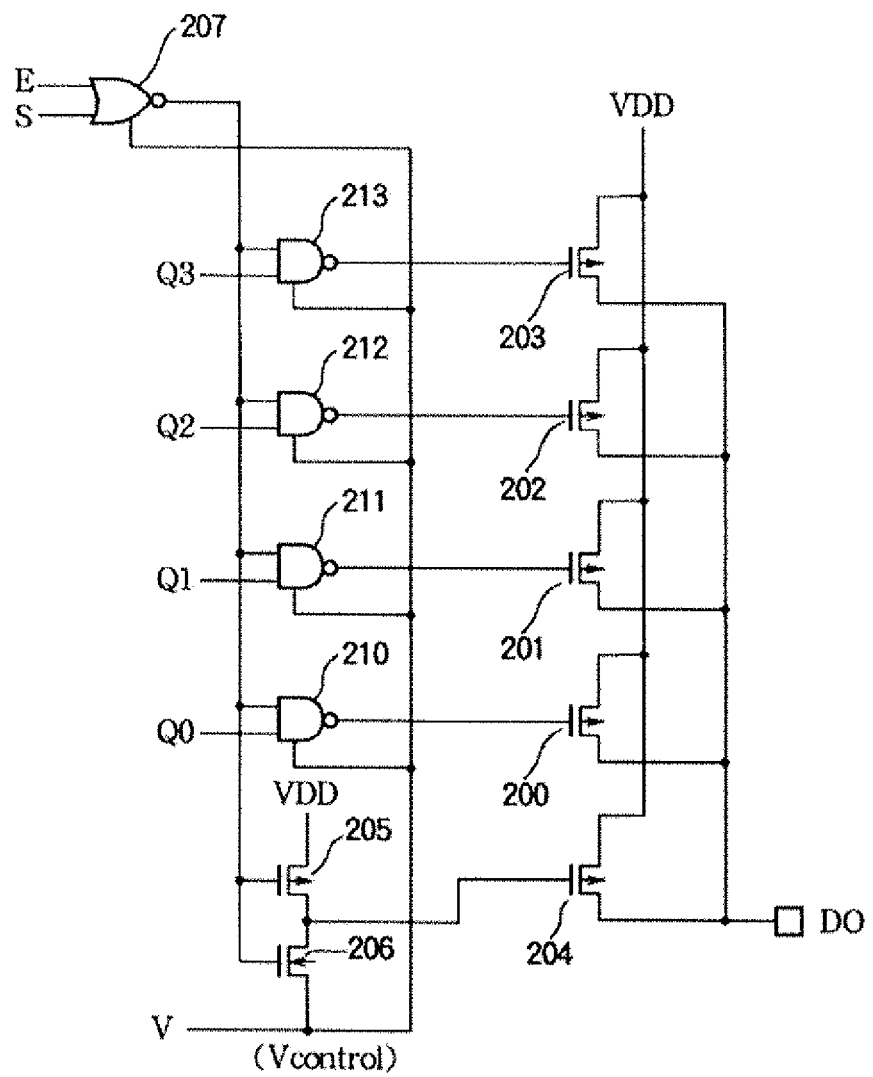
FIG. 9 is a circuit diagram illustrating an exemplary configuration of an anode driving circuit (DRV block) shown in FIG. 6.

(Configuration of Anode Driving Circuit (DRV) 119) FIG. 9 illustrates an exemplary configuration of the anode driving circuit (DRV block) 119 shown in FIG. 6. The anode driving circuit may be called an anode driving part or a first driving part. The anode driving circuit (DRV) 119 includes PMOS transistors 200-205, an NMOS transistors 206, NAND circuits 210-213, and a NOR circuit 207. In addition, the anode driving circuit 119 includes a print data input terminal E (negative logic), an input terminal S (negative logic) that provides an ON/OFF command for driving thyristor (driving anode), an input terminal V, correction data input terminals Q0-Q3, and a driving current output terminal DO.

The print data input terminal E of the anode driving circuit 119 is connected to an QN output terminal of the latch circuit, such as latch circuits LTA1-LTD1, . . . , LAT24-LTD24. In addition, the input terminals Q3-Q0 are connected respectively to the correction data output terminals Q3-Q0 of the multiplexer circuit (MUX2) shown in FIG. 7. To the terminal S, the ON/OFF command signal DRVON-N for driving thyristor (driving anode) outputted from the NAND circuit shown in FIG. 6 is inputted. To the terminal V, the control voltage Vcontrol from the control voltage generation circuit (ADJ) 122 shown in FIG. 6 is inputted.

The driving current output terminal DO is connected to the anode of the thyristor by the thin film wiring (not shown). The two input terminals of the NOR circuit 207 are connected to the terminals S and E, respectively. The first terminals of the NAND circuits 210-213 are connected to the output terminal of the NOR circuit 207. Moreover, the second terminals of the NAND circuits 213-210 are connected to the correction data output terminals Q3-Q0 of the multiplexer circuit (MUX2) 118, respectively.

The gate terminals of the PMOS transistors 200-203 are connected respectively to the output terminals of the NAND circuits 210-213. In addition, the source terminals of the PMOS transistors 200-204 are connected to the power source VDD. The drain terminals of the PMOS transistors 200-204 are connected to the driving current output terminal DO. The power source terminals of the NAND circuits 210-213 and the NOR circuit 207 are connected to the power source VDD. The ground terminals of these circuits are connected to the terminal V and maintained at the potential Vcontrol.

As described below, the potential difference between the power source VDD and the control voltage Vcontrol is approximately equivalent to the voltage between the gates and sources of the PMOS transistors 200-204 when the PMOS transistors 200-204 are turned on. By changing this voltage, the drain current of the PMOS transistors 200-204 can be adjusted.

The control voltage generation circuit (ADJ) 122 shown in FIG. 6 is provided to control the control voltage Vcontrol so that the drain current of the PMOS transistors 200-204 or the like becomes the predetermined value, after receiving the reference voltage Vref from the reference voltage circuit (not shown).

Returning to the explanation of FIG. 9, when the print data is on (input level of the terminal E at this time is low) and when the command signal S that indicates ON and OFF states for the driving of thyristors is low indicating that the driving is turned on, the output of the NOR circuit 207 rises to high. At this time, the output signal level of the NAND circuits 210-213 and the output signal level of the inverter formed from the PMOS transistor 205 and the NMOS transistor 206 are at the potential VDD or Vcontrol in accordance with the data from the terminals Q3-Q0. The PMOS transistor 204 is a main driving transistor that supplies the principle driving current to the thyristor. The PMOS transistors 200-203 are auxiliary driving transistor for correcting the light amount of the thyristor by adjusting the driving current of the thyristor for each dot.

The main driving transistor 204 is driven in accordance with the print data. The auxiliary driving transistor 200-203 are selectively driven in accordance with the output of the output terminals Q3-Q0 of the correction memory circuit (MEM2) 117 when the output of the NOR circuit 207 is at the H level.

That is, the auxiliary driving transistor 200-203 are selectively driven with the main driving transistor 204 in accordance with the above-described correction data, and a driving current, which is a sum of the drain current of the main driving transistor 204 and the respective drain current of the selected auxiliary driving transistor(s), is supplied to the thyristor from the terminal DO. When the PMOS transistors 200-203 are driven, the outputs of the NAND circuits 210-213 are at the L level (i.e., a level substantially equivalent to the control voltage Vcontrol). Therefore, the gate potential of the PMOS transistors 200-203 becomes substantially equivalent to the control voltage Vcontrol.

At this time, the PMOS transistor 205 is in the OFF state, and the NMOS transistor 206 is in the ON state. Therefore, the gate potential of the PMOS transistor 240 also becomes substantially equivalent to the control voltage Vcontrol. Therefore, the value of the drain current of the PMOS transistors 200-204 can be adjusted together by the control voltage Vcontrol.

The NAND circuits 210-213 are operated with the power source potential VDD and ground potential Vcontrol as the power source and ground potential, respectively. Therefore, the potentials of the input signals may be those that correspond to the power source potential VDD and ground potential Vcontrol, and do not require that the L level must be 0 V. As a result, the operation can be performed without problems even with the multiplexers with the configuration shown in FIG. 8.

Figure 10:
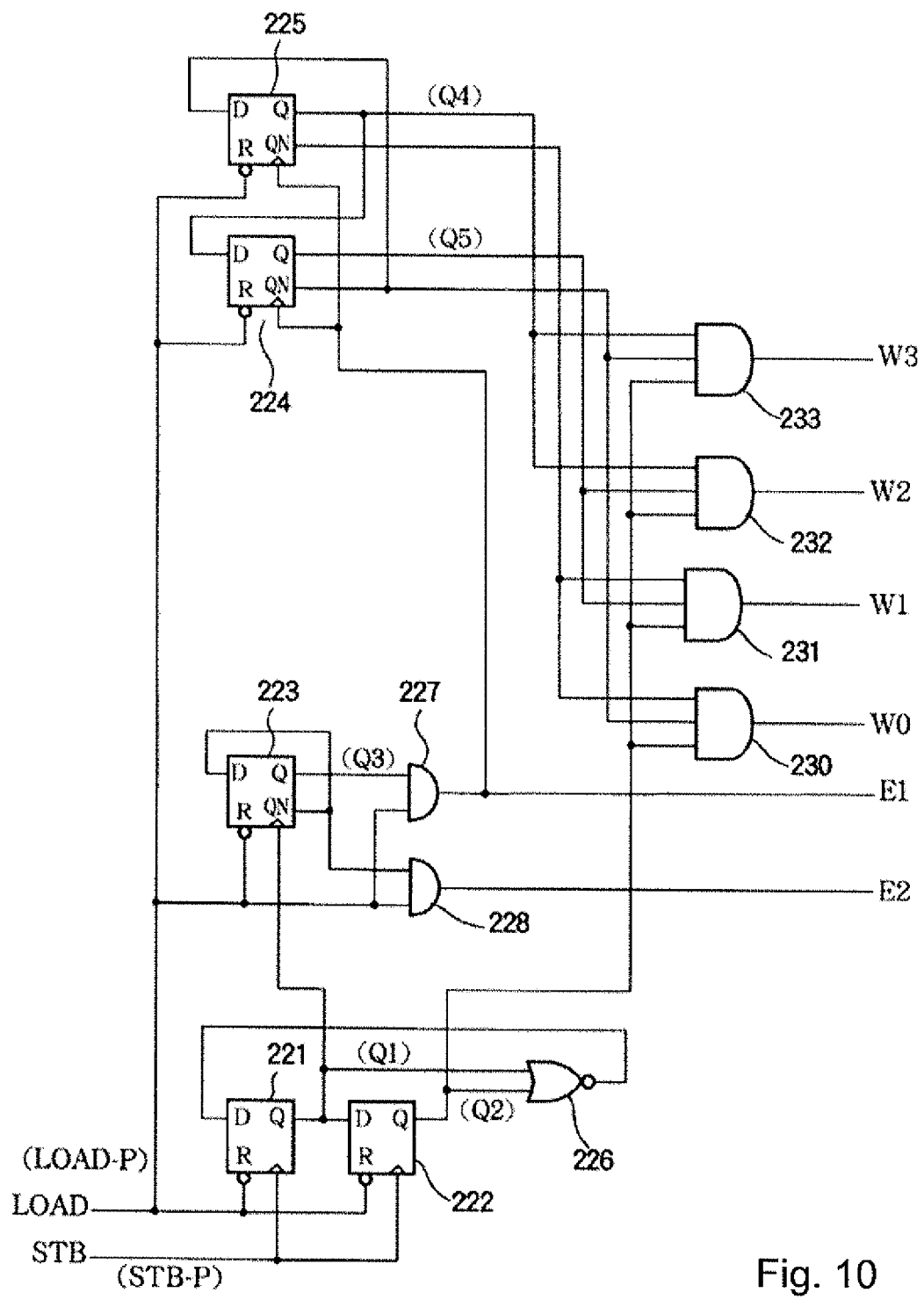
FIG. 10 is a circuit diagram illustrating an exemplary configuration of a memory control circuit (CTRL1) shown in FIG. 6.

(Configuration of Memory Control Circuit (CTRL1) 155: FIG. 10) FIG. 10 illustrates an exemplary configuration of the memory control circuit (CTRL1) 115 shown in FIG. 6. The memory control circuit 115 shown includes flip flop circuits 221-225, an NOR circuit 226, and AND circuits 227, 227 and 230-233.

Negative-logic reset terminals R of the flip flop circuits 221-225 are connected to the terminal LOAD, to which the latch signal LOAD-P is inputted. The clock terminals of the flip flop circuits 221 and 222 are connected to the terminal STB, to which the signal STB-P is inputted. Output terminals Q of the flip flop circuits 221 and 222 are connected to the input of the NOR circuit 226. The output terminal of the NOR circuit 226 is connected to the input terminal D of the flip flop circuit 221. The clock terminal of the flip flop circuit 223 is connected to the output terminal Q of the flip flop circuit 221. The output terminal QN of the flip flop circuit 223 is connected to the input terminal D of itself (flip flop circuit 223).

The output terminal Q of the flip flop circuit 223 is connected to one of the input terminals of the AND circuit 227. The output terminal QN of the flip flop circuit 223 is connected to one of the input terminal of the AND circuit 228. The signal LOAD-P is inputted to the other input terminals of the AND circuit 227 and the 228. In addition, the output terminals of the AND circuits 227 and 228 are connected to the terminals E1 and E2, respectively, to output the writing enable signals for the correction memory circuit (MEM2) 117 shown in FIG. 7.

The clock terminals of the flip flop circuits 224 and 225 are connected to the output terminal of the AND circuit 227. The terminal D of the flip flop circuit 224 is connected to the output terminal Q of the flip flop circuit 225. The input terminal D of the flip flop circuit 225 is connected to the output terminal QN of the flip flop circuit 224. The first input terminal of the AND circuit 233 is connected to the terminal Q of the flip flop circuit 225, and the second input terminal is connected to the terminal QN of the flip flop circuit 224. The first input terminal of the AND circuit 232 is connected to the terminal Q of the flip flop circuit 225, and the second input terminal is connected to the terminal Q of the flip flop circuit 224. The first input terminal of the AND circuit 231 is connected to the terminal QN of the flip flop circuit 224, and the second input terminal is connected to the terminal Q of the flip flop circuit 225. The first input terminal of the AND circuit 230 is connected to the terminal QN of the flip flop circuit 225, and the second input terminal is connected to the terminal QN of the flip flop circuit 224. The third input terminals of the AND circuits 230-233 are connected to the output terminal Q of the flip flop circuit 222. The output terminals of the AND circuits 230-233 are connected to the terminals W0-W3, respectively to transmit the writing command signals to the correction memory circuit (MEM2) 117 and the correction memory circuit (MEM) 121.

Figure 11:
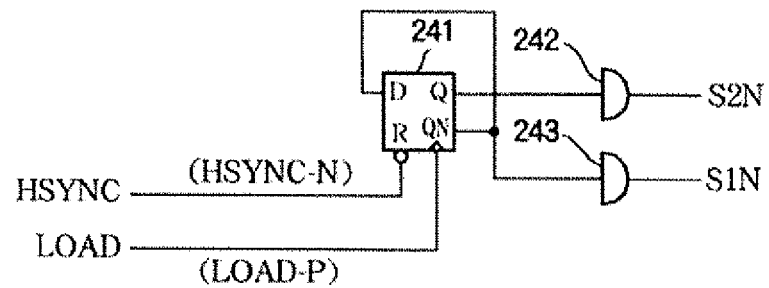
FIG. 11 is a circuit diagram illustrating an exemplary configuration of a multiplexer control circuit (CTRL2) shown in FIG. 6.

(Configuration of Multiplexer Control Circuit (CTRL2) 116: FIG. 11) FIG. 11 illustrates an exemplary configuration of the multiplexer control circuit (CTRL2) 116 shown in FIG. 6. The multiplexer control circuit (CTRL2) 116 shown includes a flip flop circuit 241 and buffer circuits 242 and 243. The clock terminal of the flip flop circuit 241 is connected to the terminal LOAD, from which the signal LOAD-P is inputted. The negative-logic reset terminal R is connected to the terminal HSYNC, from which the signal HSINC-N is inputted. In addition, the terminal D of the flip flop circuit 241 is connected to the terminal QN terminal of itself (flip flop circuit 241). The input terminal of the buffer circuit 242 is connected to the terminal Q of the flip flop circuit 241. The input terminal of the buffer circuit 243 is connected to the terminal QN of the flip flop circuit 241. The output terminals of the buffer circuits 243 and 242 are connected to the data selection terminals S1N and S2N, from which the data selection command signals are outputted to the multiplexer circuit (MUX2) 118 shown in FIG. 6.

Figure 12:
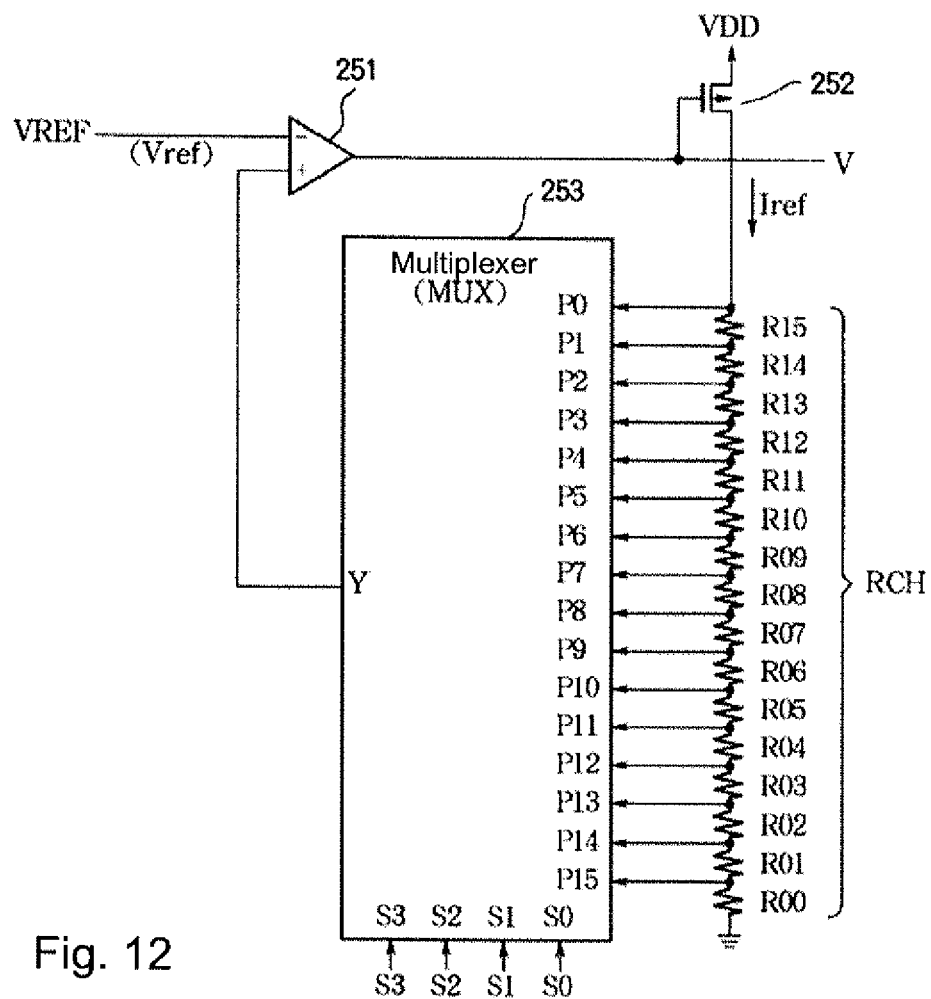
FIG. 12 is a circuit diagram illustrating an exemplary configuration of a control voltage generation circuit (ADJ) shown in FIG. 6.

(Control Voltage Generation Circuit (ADJ) 122) FIG. 12 illustrates an exemplary configuration of the control voltage generation circuit (ADJ) 122.

The control voltage generation circuit (ADJ) 122 shown in FIG. 12 includes an operating amplifier 261, a PMOS transistor 252, an analog multiplexer 253, and a resistor array RCH. Of the PMOS transistor 252, the source terminal is connected to the power source VDD, and the gate terminal is connected to the output terminal of the operating amplifier 251 and the terminal V, which outputs the control voltage Vcontrol. The PMOS transistor 252 is configured to have a gate length that is equivalent to that for the PMOS transistors 200-204 shown in FIG. 9. The drain current of the PMOS transistor 252 is indicated as a symbol Iref in the figure.

The inverting input terminal of the operating amplifier 251 is connected to the terminal VREF, to which the reference voltage Vref is applied. The non-inverting input terminal of the operating amplifier 251 is connected to the output terminal Y of the multiplexer 253. The output terminal of the operating amplifier 251 is connected to the gate terminal of the PMOS transistor 252 and the terminal V, which is connected to the anode driving circuit (DRV) 119 shown in FIG. 9. The resistor array RCH is formed from resistors R00-R15 that are connected in series as shown in FIG. 12.

The multiplexer 253 includes 16 input terminals P0-P15 to which analog voltage is inputted, the output terminal Y that outputs the analog voltage, four input terminals S3-S0 to which logic signals are inputted. Based on a combination of the 16-way signal logic set by the four logic signals S3-S0, one of the terminals P0-P15 is selected, and the potential applied to the terminal is outputted from the output terminal Y. In other words, one of the input terminals P0-P15 is selected based on the logic signal level of the input terminals S3-S0 to form a current path between the selected terminal and the output terminal Y.

A circuit configured from the operating amplifier 251, the resistor array RCH and the PMOS transistor 252 forms a feedback control circuit, by which the potential at the non-inverting input terminal of the operating amplifier 251 becomes approximately equivalent to the reference voltage Vref. As a result, the drain current (Iref) of the PMOS transistor 252 is determined from the combined resistance value of the resistors R00-R15 that is selected from the multiplexer 251 (combined value of the resistors between the input terminal selected by the multiplexer 251 and ground) and the reference voltage Vref inputted to the operating amplifier 251.

For example, when the logic value of the input terminals S3-S0 is "1111" and when the instruction indicates the maximal correction state, current passes between the input terminal P15 and the output terminal Y of the multiplexer 253. Therefore, the voltage at the input terminal P15 is controlled to become approximately equivalent to the reference voltage Vref. As a result the drain current Iref of the PMOS transistor 252 is calculated as follows:

$$Iref=Vref/R00$$

Moreover, when the logic value of the input terminals S3-S0 is "0111" and when the instruction indicates the center correction state, current passes between the input terminal P7 of the multiplexer 253 and the output terminal Y. Therefore, the voltage at the input terminal P7 is controlled to become approximately equivalent to the reference voltage Vref. As a result, the drain current Iref of the PMOS transistor 252 is calculated as follows:

$$Iref=Vref/(R00+R01+\ldots+R07+R08)$$

Further, when the logic value of the input terminals S3-S0 is "0000" and when the instruction indicates the minimal correction state, current passes between the input terminal P0 of the multiplexer 253 and the output terminal Y. Therefore, the voltage at the input terminal P0 is controlled to become approximately equivalent to the reference voltage Vref. As a result the drain current Iref of the PMOS transistor 252 is calculated as follows:

$$Iref=Vref/(R00+R01+\ldots+R14+R15)$$

As discussed above, because the gate lengths of the PMOS transistors 200-204 shown in FIG. 9 and the PMOS transistor 252 are formed to be equivalent, and because these transistors are controlled to operate in the saturation region, each of the transistors forms a current mirror relationship and generates the drain current that is proportional to the current Iref when the PMOS transistors 200-204 are turned on. As a result, the current Iref can be adjusted to one of 16 levels based on the state of the logic value provided to the input terminals S3-S0 of the multiplexer 253. Therefore, the drain current of the PMOS transistors 200-204 shown in FIG. 9 can also be adjusted to one of 16 levels.

Figures 13A, 13B:
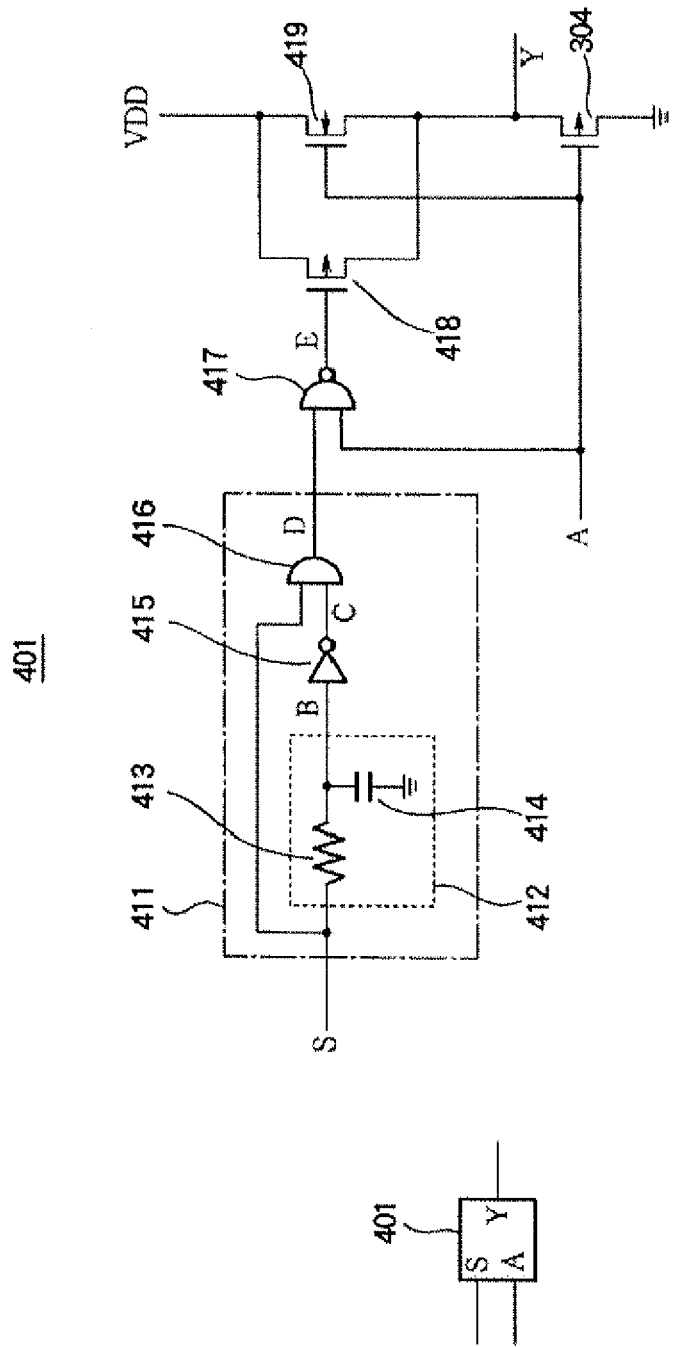
FIGS. 13A and 13B illustrate configurations of driving buffer circuits shown in FIG. 6.

(Configuration of Gate Driving Buffer Circuits 401 and 402) FIGS. 13A and 13B are circuit diagrams illustrating configuration of the driving buffer circuits 401 and 402 for the gate terminal of the thyristor shown in FIG. 6. Because the buffer circuits 401 and 402 include the same configuration, the configuration and operation of the buffer circuit 401 are described below as a representative example. The buffer circuit may be called a gate driving circuit, a gate driving part or a second driving part.

FIG. 13A illustrates circuit symbols for the buffer circuit 401, and FIG. 13B is a circuit diagram illustrating a circuitry of the buffer circuit 401. The buffer circuit 401 shown in the figures includes a front edge detection circuit 411, an NAND circuit 417, PMOS transistors 418 and 304, and an NMOS transistor 419. The front edge detection circuit 411 is a circuit that generates an H level pulse only for a predetermined length of time after the input signal rises and that includes a delay circuit 412, an inverter circuit 415 and an AND circuit 416. The delay circuit 412 includes a resistor 413 and a capacitor 414.

The input terminal S of the buffer circuit 401 is connected to the input terminal of the delay circuit 412. The input terminal of the delay circuit 412 is connected to one end of the capacitor 414 via the resistor 413. The other end of the capacitor is connected to ground. In addition, the output terminal of the delay circuit 412 is connected to the input terminal of the inverter circuit 415. One of the input terminals of the AND circuit 416 is connected to the input terminal S of the buffer circuit 401. The other input terminal of the AND circuit 416 is connected to the output terminal of the inverter circuit 415. The output terminal of the AND circuit 416 is connected to one of the input terminals of the NAND circuit 417. The other input terminal of the NAND circuit 417 is connected to the input terminal A of the buffer circuit 401.

The output terminal of the NAND circuit 417 is connected to the gate terminal of the PMOS transistor 418. The source of the PMOS transistor 418 is connected to the power source VDD. The drain terminal of the PMOS transistor 418 is connected to the output terminal Y of the buffer circuit 401. In addition, the drain terminal of the NMOS transistor 419 is connected to the power source VDD. The source terminal of the NMOS transistor 419 is connected to the output terminal Y of the buffer circuit 401. The gate terminal of the NMOS transistor 419 is connected to the input terminal A of the buffer circuit 401.

The source terminal of the PMOS transistor 304 is connected to the output terminal Y of the buffer circuit 401. The drain terminal of the PMOS transistor 304 is connected to ground. The gate terminal of the PMOS transistor 304 is connected to the input terminal A of the buffer circuit 401.

In the figures, a capacitor-resister (CR) delay circuit formed from the resistor 413 and the capacitor 414 is shown as an example of the delay circuit 412. However, the circuit is not limited to this formation. The delay circuit 412 may be formed from different configuration, such as a configuration including an even number of inverter circuits that are connected in a cascade or other variations.

(Comparison: Configuration of Conventional Gate Driving Buffer)

In the conventional buffer circuits that correspond to the above-described buffer circuits 401 and 402, a single PMOS transistor that is the same as the transistor 304 is used instead of the transistors 418 and 419 shown in FIG. 13. When the thyristor is in the non-light emitting state, the gate terminal is at a potential that is approximately equivalent to the power source voltage VDD. The power source voltage VDD is 5 V in the typical design example. In contrast, the withstand voltage of the thyristor is only 7 V, which does not provide sufficient room with respect to the power source voltage VDD. Therefore, a problematic symptom, such as degradation of thyristor, results due to application of the power source voltage VDD for a long period of time.

Figure 14:
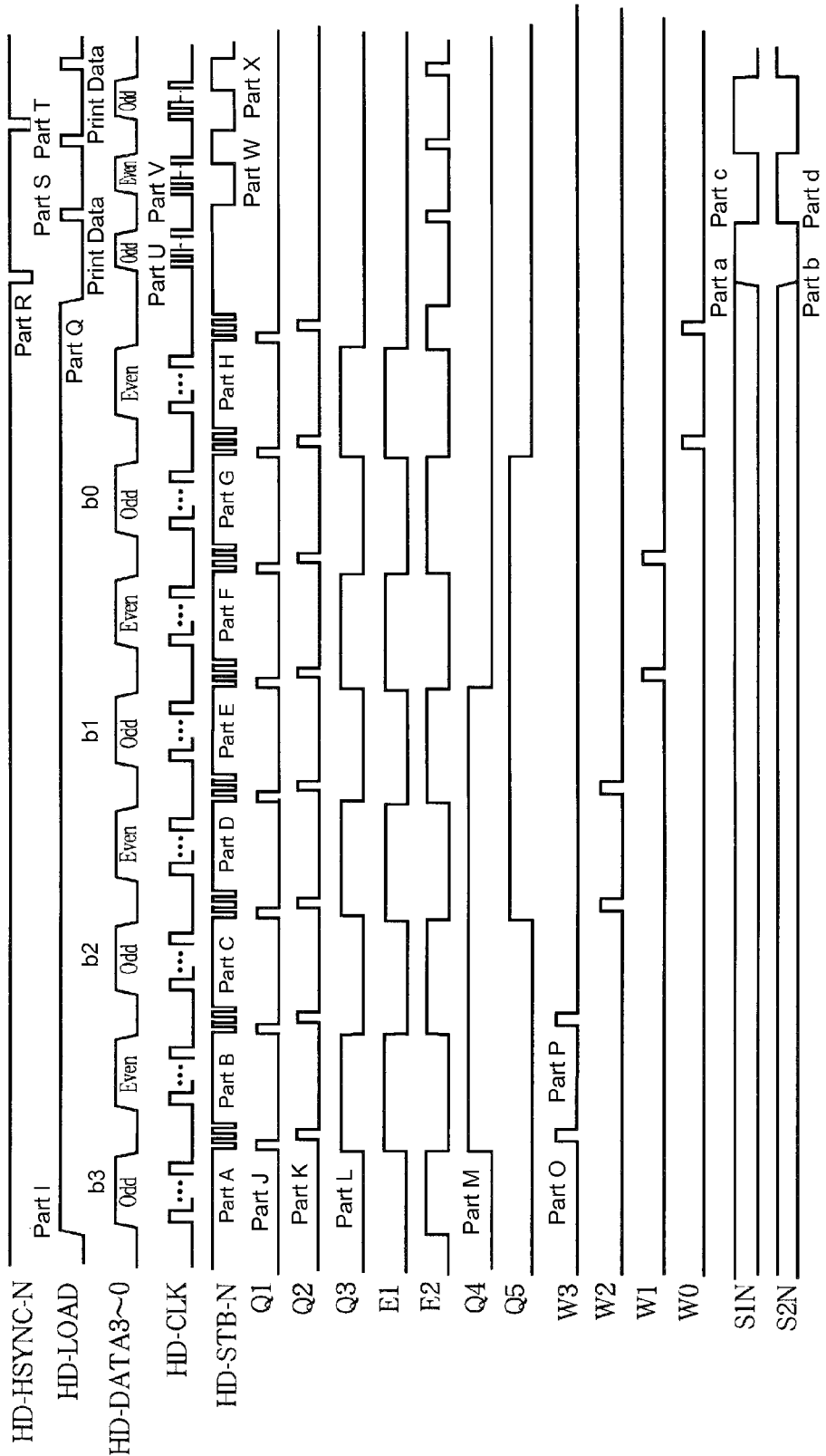
FIG. 14 is a time chart illustrating of a correction data transmitting process, which is performed for an optical print head having a configuration of the embodiment after turning on the printer, and a sequence for transmitting print data, which is performed after the correction data transmitting process.

(Operation of First Embodiment) (Explanation of Entire Time Chart) FIG. 14 illustrates a time chart that shows a correction data transmission process executed for the optical print head including the configuration of the present embodiment after turning on the printer, and that shows activities of the print data transmission performed thereafter. The correction data for the dot of the thyristor is made of four bits (bit3-bit0) for each dot.

Prior to starting the transmission of the correction data, the signal HD-LOAD, which indicates that the subsequent data transmission relates to correction data, rises to the H level (part I). Then, the correction data, which is formed by four bits bit3-bit0 per dot, is sequentially inputted from HD-DATA3-0 for odd and even-number dots as in a synchronous manner with the clock HD-CLK. First, the correction data at the bit bit3 is inputted for an odd-number dot and is shift inputted to the shift resistor formed from the flip flop circuits (FFA1-FFD25) shown in FIG. 6. When the shift input is completed, three pulses of the signal HD-STB-N shown at part A are inputted, thereby causing the operation of the circuit shown in FIG. 10.

Symbols Q1 and Q2 shown in FIG. 14 indicate the outputs Q of the flip flop circuits 221 and 222 shown in FIG. 10. Similarly, symbol Q3 indicates the output Q of the flip flop circuit 223. Symbol Q4 indicates the output Q of the flip flop circuit 225. Symbol Q5 indicates the output Q of the flip flop circuit 224. In addition, symbols E1 and E2 indicate the outputs of the AND circuit 227 and 228, and symbols W3-W0 indicate the outputs of the AND circuits 233-230. Furthermore, symbols S1N and S2N indicate the data selection signals outputted from the AND circuits 243 and 242 shown in FIG. 11.

When the first pulse of the signal HD-STB-N is inputted at part A shown in FIG. 14, the signal Q1 is generated (rises) as indicated at part J. Subsequently, when the second pulse of the signal HD-STB-N is inputted, the signal Q2 is generated as indicated at part K.

Moreover, each time when the signal Q1 rises, the state of the signal Q3 is inverted. For example, at the part L, the signal Q3 shifts to the H level. Subsequent to the shifting of the signal Q3, the signals E1 and E2 are generated. At the rising edge of the signal E1, the signal Q4 rises as indicated at part M, and at the next rising edge of the signal E1, the signal Q5 rises. Further, at the following rising edge of the signal E1, the signal Q4 falls as indicated at part M, and at the next rising edge of the signal E1, the signal Q5 falls.

The signals W3-W0 are generated following the signal Q2. The signal W3 is outputted (rises high) twice as indicated at parts O and P. Then, two pulses of each of the signals W2-W0 are generated. When each pulse signal of the above-described signals W3-W0 is generated, the data is written to the correction memory circuit (MEM2) 117 shown in FIG. 7. The data is written to the memory cell (e.g., memory cell 151) for the odd-number dot at the first pulse of the signals W3-W0, and the data is written to the memory cell (e.g., memory cell 152) for the even-number dot at the second pulse of the signals W3-W0.

The above-described data writing command signals at the first pulse of the signals W3-W0 are generated based on the signal HD-STB-N that is inputted at the parts A, C, E and G in FIG. 14. The above-described data writing command signals at the second pulse of the signals W3-W0 are generated based on the signal HD-STB-N that is inputted at the parts B, D, F and H in FIG. 14.

When the writing of all bit3-bit0 of the correction data is completed after the above-described process, the signal HD-LOAD falls to the L level as indicated at part Q, and the states shifts to a print data transmittable state. At the start of printing a single line, the signal HD-HSYNC-N is inputted to indicate that the subsequent data transmission is for an odd-number dot (part R). Then, the print data for the odd-number dot is transmitted (Odd), and the data that is shift-inputted to a shift resistors (FFA1-FFD1, . . . , FFA24-FFD24) is latched to latch elements (LTA1-LTD1, . . . , LTA24-LTD24).

In addition, the signal HD-STB-N is shifted to the L level as indicated at part W, and the driving for the light emission by the thyristor element is performed. When the print data is turned on, the thyristor is driven to emit light while the signal HD-STB-N at part W or X is at the L level.

Similarly, data transmission for the even-number dots (Even) is performed at part V, and the data transmitted is latched by the pulse at part T. As shown in FIG. 6, the data selection signal S1N outputted from the multiplexer control circuit (CTRL2) 116 becomes the gate driving signal G1 via the buffer circuit 401 to drive the gate terminal of the odd-number thyristors. In addition, the data selection signal S2N outputted from the multiplexer control circuit (CTRL2) 116 becomes the gate driving signal G2 via the buffer circuit 402 to drive the gate terminal of the even-number thyristors. Therefore, the gate driving signals G1 and G2 are generated for the thyristors by the circuit shown in FIG. 13B.

Figure 15:
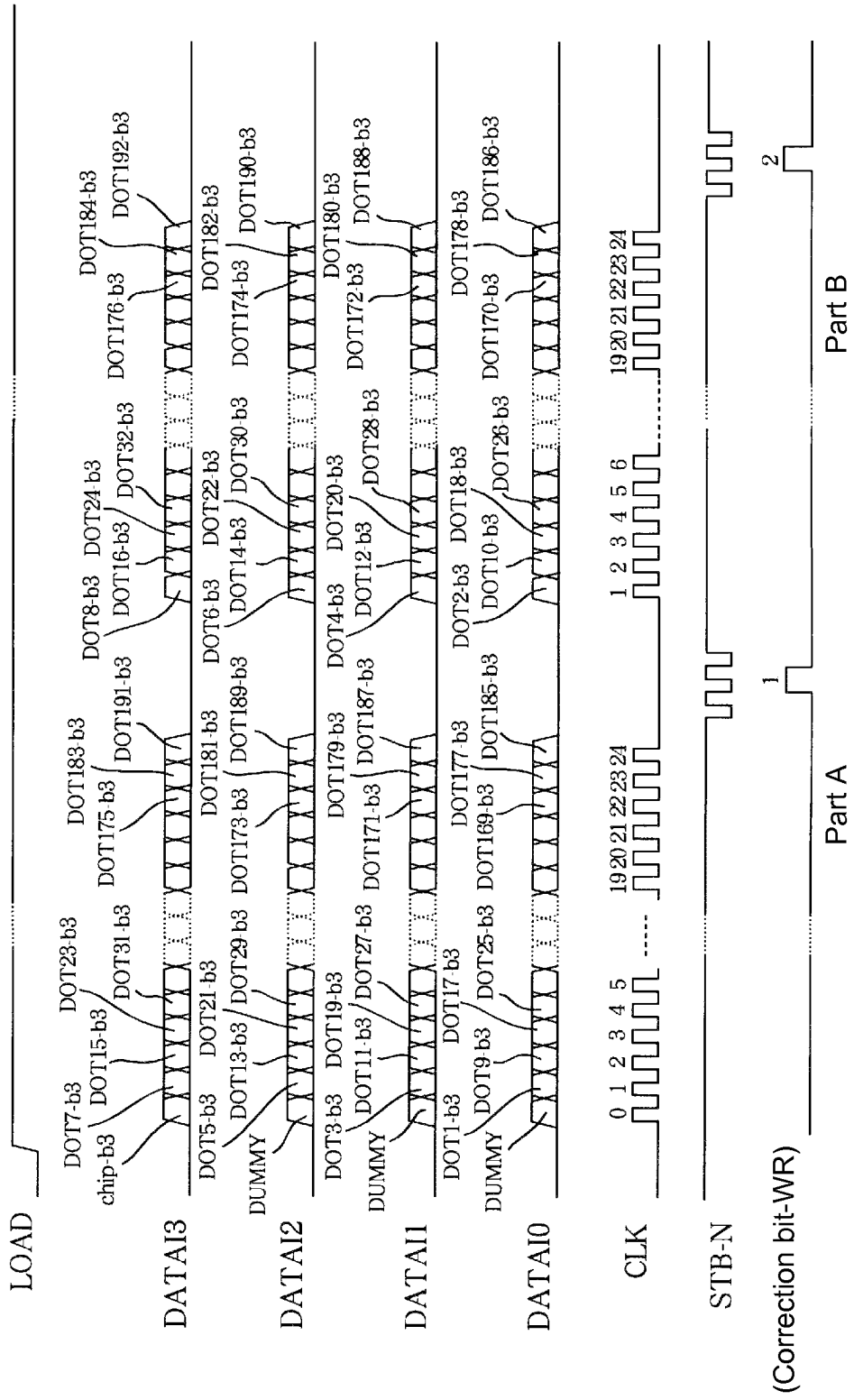
FIG. 15 is a time chart illustrating detailed waveforms at parts A and B shown in FIG. 14 for transmitting the correction data when the circuit is simplified with a single the driver IC chip.
Figure 16:
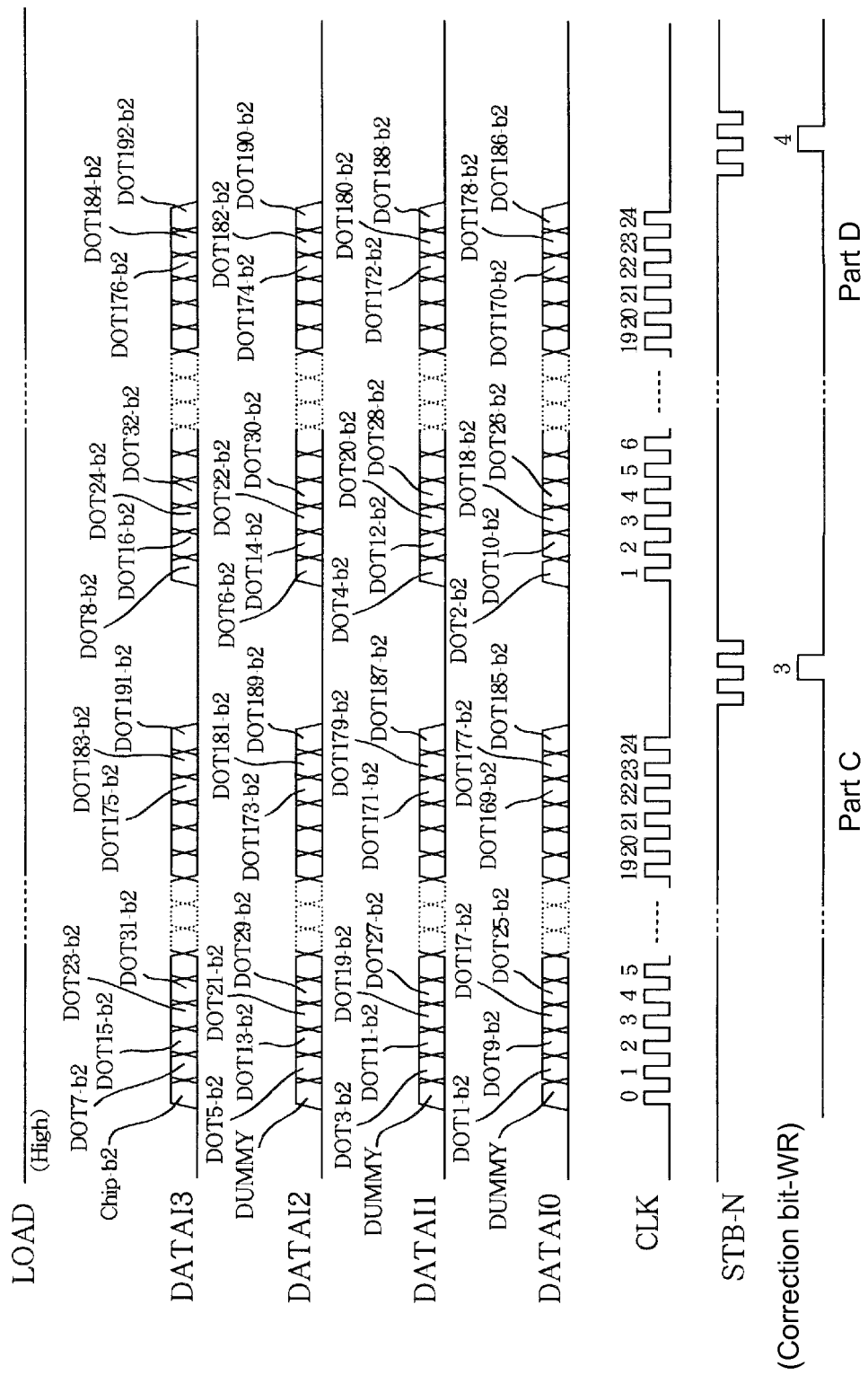
FIG. 16 is a time chart illustrating detailed waveforms at parts C and D shown in FIG. 14 for transmitting the correction data when the circuit is simplified with a single the driver IC chip.
Figure 17:
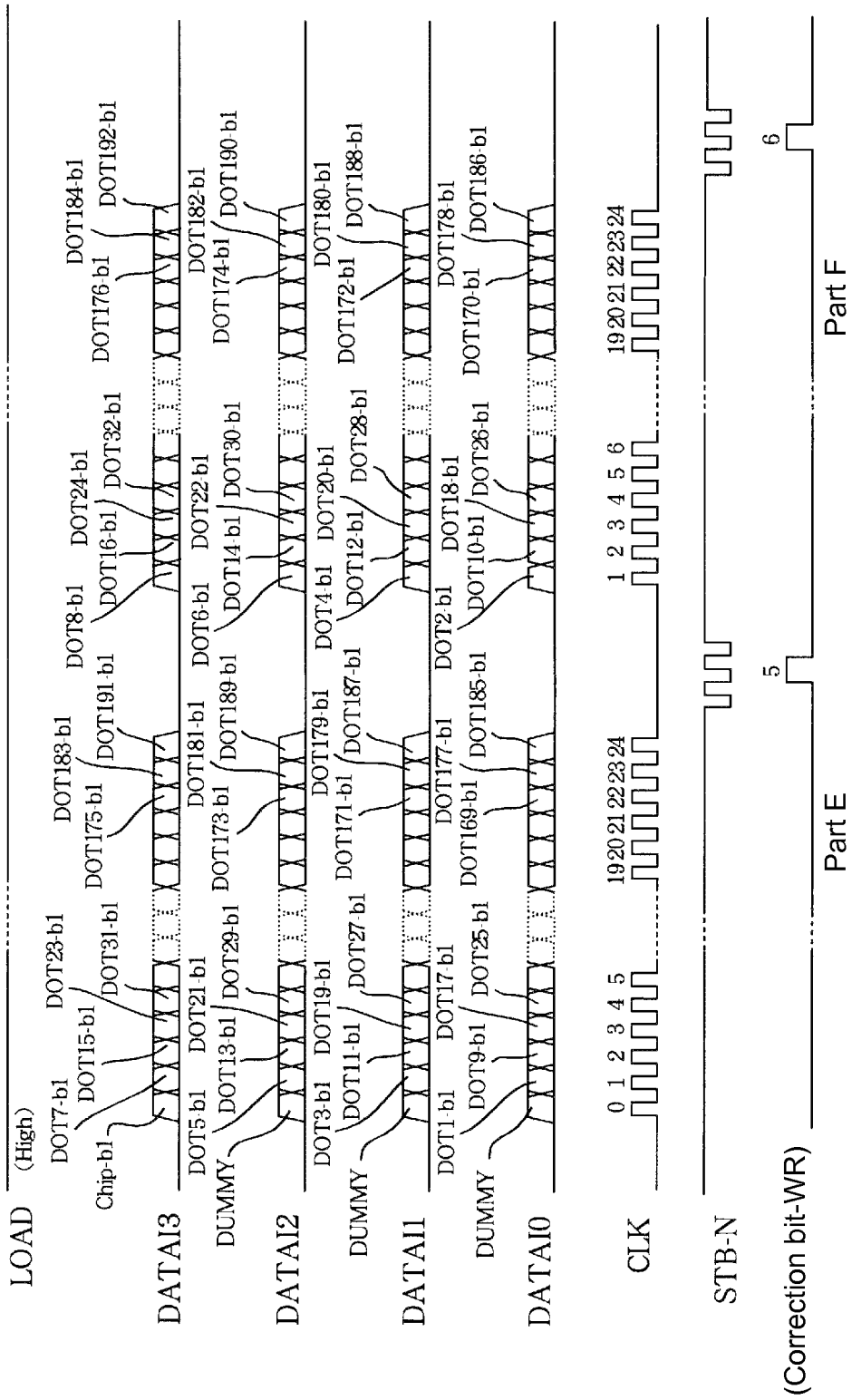
FIG. 17 is a time chart illustrating detailed waveforms at parts E and F shown in FIG. 14 for transmitting the correction data when the circuit is simplified with a single the driver IC chip.
Figure 18:
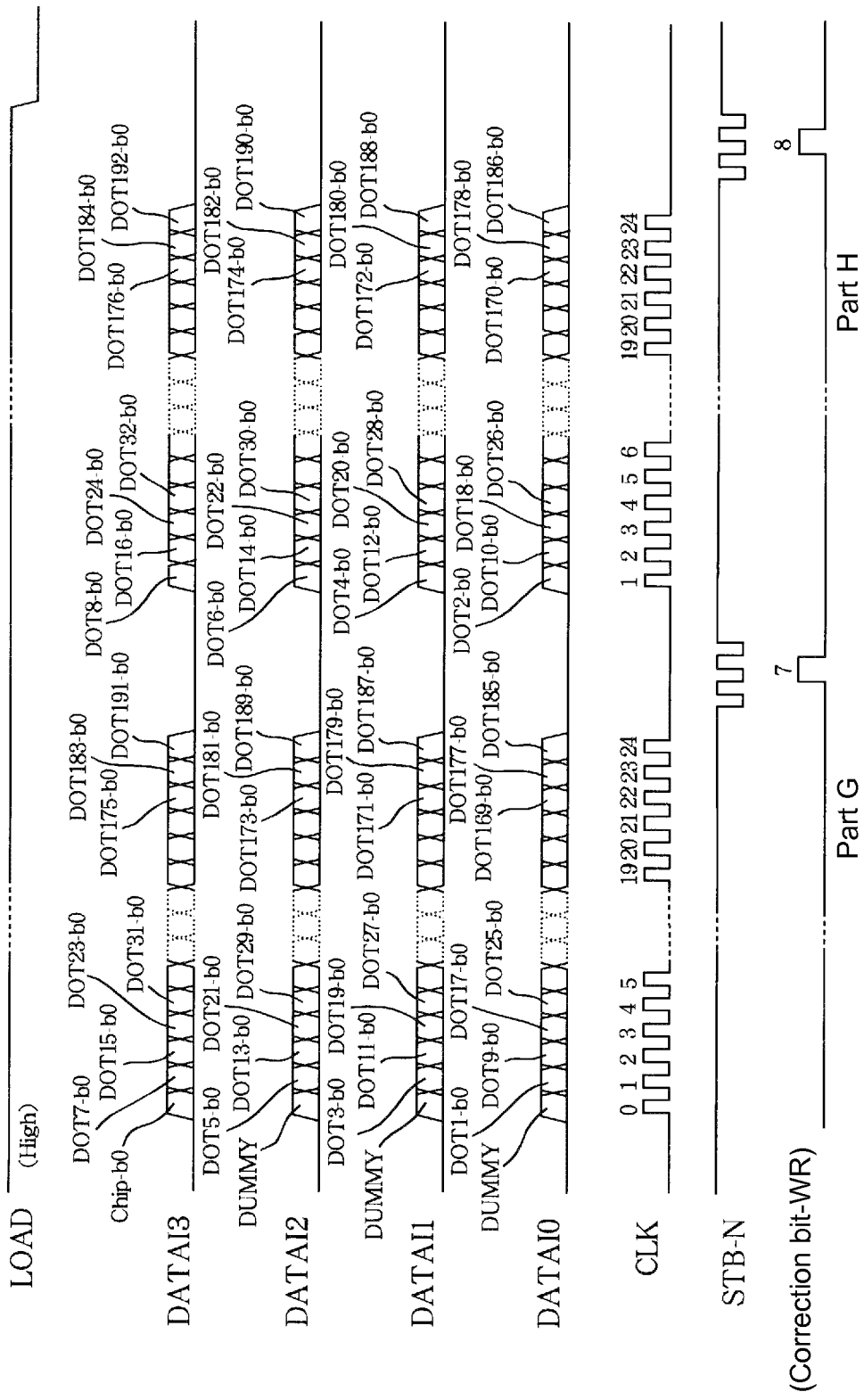
FIG. 18 is a time chart illustrating detailed waveforms at parts G and H shown in FIG. 14 for transmitting the correction data when the circuit is simplified with a single the driver IC chip.

(Time Chart for Transmitting Correction Data) FIGS. 15-18 illustrate detailed waveforms for transmitting the correction data when the driver IC is simplified with a single chip. FIG. 15 illustrates parts A and B in FIG. 14 in more detail. FIG. 16 illustrates parts C and E in FIG. 14 in more detail. FIG. 17 illustrates parts E and F in FIG. 14 in more detail. FIG. 18 illustrates parts G and H in FIG. 14 in more detail.

Returning to FIG. 14, the chip correction data to be set to each driver IC is sufficient with a single transmission of either the data for the odd-number dot (e.g., part A) or for the even-number dot (e.g., part B). Therefore, in FIGS. 15-18, the number of stages of the shift resister is switched to increase by one stage at the time of transmitting the correction data for the odd-number dots at parts A, C, E and G, and chip correction data (described as, Chip-b3, Chip-b2, Chip-b1, Chip-b0 and the like) is assigned at the beginning of the transmitted data array that is inputted via the data input terminal DATAI3. In contrast, dummy data DUMMY is transmitted the beginning of the transmitted data array that is inputted via the data input terminals DATAI2, DATAI1 and DATAI0.

Figure 19A:
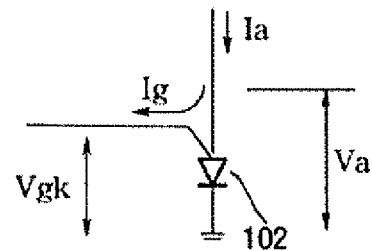
FIGS. 19A-19E explain operations of the gate driving buffer circuits of the light emitting thyristor shown in FIG. 6.
Figure 19B:
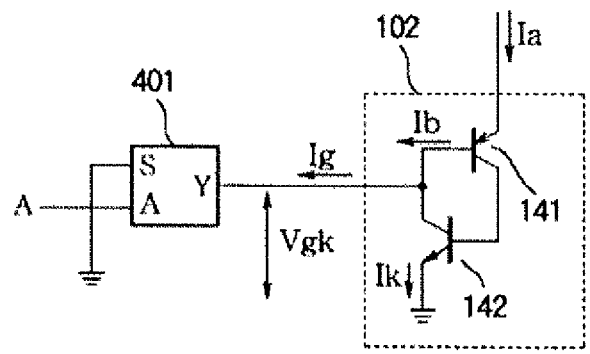

(Explanation of Gate Driving Buffer) FIGS. 19A-19E explain the operation of the gate driving buffer circuits 401 and 402 for the thyristors shown in FIG. 6. FIG. 19A illustrates symbols for the thyristor 102 and voltage and current flowing at each terminal of the thyristor 102. FIG. 19B illustrates the buffer circuit 401 and the main part of the thyristor 102 connected to the buffer circuit 401 and includes an equivalent circuit of the thyristor 102 as surrounded by broken lines. The reference numeral 141 is a PNP transistor, and the reference numeral 142 is an NPN transistor.

In FIG. 19B, the input terminals S and A are at the L level for the purpose of explaining the process for turning on the thyristor 102.

In FIG. 13B, because the terminal A is at the L level, the output of the NAND circuit 417 rises to the H level. Therefore, the PMOS transistor 418 is off, the NMOS transistor 419 is off, and the PMOS transistor 304 is on. As a result, the potential of the output terminal of the buffer circuit 401 falls. The potential is equivalent to the voltage Vgs between the gate and source of the PMOS transistor 304 and eventually falls to the threshold voltage Vt of the PMOS transistor 304.

Returning to FIG. 19B, to drive the thyristor 102, a signal is outputted from the terminal DO of the driver IC (not shown) to generate the anode current Ia shown in the drawing. At this time, the current flows as a forward direction current through the PN junction, that is, between the emitter and base of the PNP transistor 141, between the anode and gate of the thyristor 102 and causes the gate current Ig shown in the drawing. As the result of the above-described current flow, the anode potential is generated at the thyristor 102. In FIG. 19A, the potential at the anode terminal and the potential at the gate terminal are indicated as Va and Vgk, respectively. In FIG. 19B, the gate current Ig corresponds to the base current Ib of the PNP transistor 141 inside the thyristor 102. As the current flows, the PNP transistor 141 starts shifting to the ON state and generates collector current to the collector of the PNP transistor 141. The collector current becomes the base current of the PNP transistor 142 and causes the NPN transistor 142 to shift to the ON state.

The generated collector current enhances the base current Ib of the PNP transistor and accelerates the shifting of the PNP transistor 141 to the ON state. After the NPN transistor 142 completes shifts to the ON state, the voltage between the collector and emitter decreases and becomes a potential lower than the threshold voltage Vt of the PMOS transistor 304. As a result, the current Ig that flows from the gate terminal of the thyristor 102 to the side the output terminal of the buffer circuit 401 becomes approximately zero, and the cathode current Ik flows to the cathode terminal of the thyristor, which is approximately equivalent to the anode current Ia. Therefore, the thyristor 102 is completely turned to the ON state.

Figure 19C:
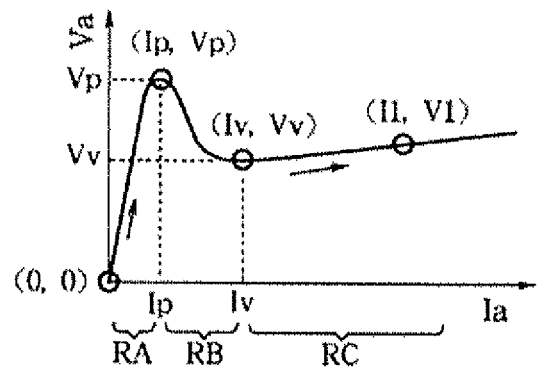

FIG. 19C explains the process for turning on the above-described thyristor 102 and indicates the anode current Ia on the horizontal axis and the anode terminal potential Va on the vertical axis. In the non-light emitting (OFF) state of the thyristor, the anode current is approximately zero and is at the origin (0, 0) of the graph shown in FIG. 19C. When the anode current starts flowing as the thyristor starts turning on, the anode potential increases as shown by an arrow in the drawing and reaches the potential Vp. Because the voltage Vag between the anode and gate of the thyristor 102 is equivalent to the voltage Vbe between the emitter and base of the PNP transistor 141, and because the L level output voltage (VoL) of the buffer circuit 401 corresponds to the voltage Vgs between the gate and source of the PMOS transistor 304, there is the following relationship with the above-described voltage Vp:

$$Vp=Vag+VoL=Vag+Vgs$$

The gate current Ig (equivalent to the base current Ib of the transistor 141) is generated as the voltage Vp is applied in the forward direction. The circled point (Ip, Vp) in FIG. 19C corresponds to the border between the ON region RA and the OFF transition region RB for the thyristor 102.

In FIG. 19A, only the thyristor 102 is shown. However, as explained using FIG. 2, the thyristor 101 is connected in parallel to the anode and cathode terminals of the thyristor 102. Therefore, when the process for turning on the thyristor 102 is considered, it is necessary to consider a condition to maintain the thyristor 101 in the OFF state.

As discussed above, in the process for turning on the thyristor 102, the anode potential Va has the above-described peak value Vp. When the symbol VoH refers to the gate potential of the thyristor 101 on the non-light emitting side, the symbol Vag refers to the voltage between the anode and gate of the thyristor, and the symbol Vf refers to the voltage Vag between the anode and gate of the thyristor when starting to generate the gate current, it is understood that the following equation must be met in order to prevent the gate current from being generated at the thyristor 101 on the non-light emitting side due to the voltage Vp (peak value of the voltage between the anode and cathode in the process for turning on the thyristor):

$$Vp<VoH+Vf$$

In other words, the following equation must be met:

$$VoH>Vp-Vf$$

In addition, in the circuit shown in FIG. 13:

$$VoH<VDD$$

In FIG. 19C, as the anode current Ia further increases from the above-described peak point Ip, the anode potential Va decreases and reaches the circled point (Iv, Vv). This point corresponds to the boarder of the ON transition region RB and the ON region RC of the thyristor. The gate current Ig at this point has decreased to approximately zero and is in a state equivalent to when the buffer circuit 40 is substantially separated from the gate terminal of the thyristor 102.

As the anode current Ia further increases, the anode potential also increases and reaches the circled point (I1, V1). This point is the final operation point for driving the light emission of the thyristor, at which the thyristor is driven to emit light at the predetermined light emission power based on the current value (I1) that corresponds to the anode current Ia supplied from the side of the driver IC.

Figure 19D:
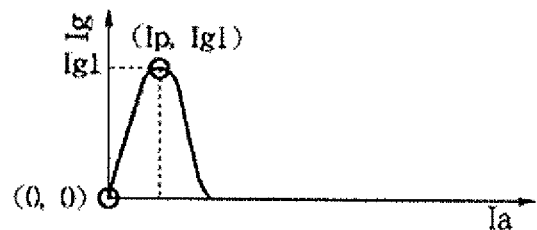

FIG. 19D corresponds to FIG. 19C and indicates the anode current Ia on the horizontal axis and the gate current Ig on the vertical axis. FIG. 19D shows the relationship among the gate current, the peak value Ig1 of the gate current, the anode voltage Vp and the anode current Ip of the thyristor that are generated in the process for turning on the thyristor.

Figure 19E:
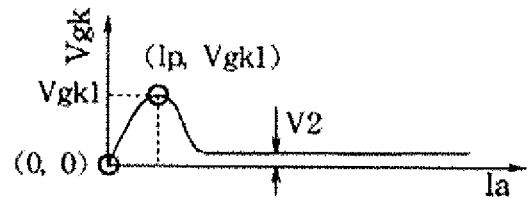

Moreover, FIG. 19E corresponds to FIG. 19C and indicates the anode current Ia on the horizontal axis and the voltage Vgk between the gate and cathode of the thyristor on the vertical axis. In the process for turning on the thyristor, the gate current Ig is generated, and the output voltage VoL of the gate driving buffer circuit 401 (equivalent to the voltage Vgk between the gate and cathode of the thyristor) is determined based on the gate current Ig. When the thyristor 102 is completely turned on, that is, when the thyristor 102 is turned to the saturation state as the NPN transistor turns on, the above-described voltage drops to the potential V2 shown in FIG. 19E. This potential corresponds to the saturation voltage Vce (sat) between the collector and emitter of the NPN transistor 142. Therefore, the L level output voltage (VoL) of the buffer circuit 401 shown in FIG. 13B, that is, the voltage Vgs between the gate and source of the PMOS transistor 304 is equal to or less than the threshold voltage, which results in the voltage V2 being less than the voltage Vt (V2<Vt). As a result, the PMOS transistor 304 eventually becomes off (in a sub-threshold operation state to be more accurate), and the gate current shown in FIG. 19B becomes approximately zero.

The process for turning on the thyristor is described using FIGS. 19B-19E. By using the gate driving buffer circuit 401, the flowing of the gate current from the thyristor after turning to the ON state is prevented, thereby allowing the thyristor to be driven in the ON state with the anode current Ia and the cathode current Ik being approximately equivalent to each other. Therefore, by adjusting the anode current Ia, the light emission power that corresponds to the anode current Ia is obtained.

Such operation is an effect by a configuration of the L level side output of the buffer circuit using the PMOS transistor. With an NMOS transistor, instead of the PMOS transistor 304, as in a normal CMOS output circuit, the L level output falls to a potential of approximately 0 V. Therefore, the base current of the PNP transistor 141 flows as current Ig to the buffer circuit side. Because of this, the collector current of the NPN transistor 141 is reduced by the rate of the base current. Therefore, the cathode current Ik of the thyristor is also reduced. As a result, there is a possibility that the light emission output of the thyristor is varied. On the other hand, with the configuration using the gate driving buffer circuit as shown in FIG. 13B, the above-described problem is prevented from occurring.

Next, the operation of the gate driving buffer circuit 401 shown in FIG. 13B at the time of the H level output is explained. This corresponds to the case where the thyristor 102 in FIGS. 19B-19E is in the OFF state. When the input terminal S of the buffer circuit 401 is at the L level and the input terminal A is at the H level in FIG. 13B, the potential at the output (point D) of the AND circuit 416 shown in FIG. 13B is at the L level, and the output (point E) of the NAND circuit 417 is at the H level. Therefore, the PMOS transistor 418 is in the OFF state.

When the input terminal A of the buffer circuit 401 turn to the H level, the PMOS transistor 304 is turned to the OFF state, and the NMOS transistor 419 is turned to the ON state, resulting an increase of the potential at the output terminal Y. However, because the source terminal of the NMOS transistor 419 is connected to the output terminal Y, if the potential at the output terminal Y rises to the potential that is equivalent to the potential VDD−Vt, the voltage Vgs between the gate and source of the NMOS transistor 419 falls to the value approximately equivalent to the threshold voltage Vt. Therefore, the NMOS transistor 419 is turned to the OFF state (subthreshold state).

As a result, although the output terminal Y turns to the H level, the potential VoH at the output terminal Y rises only to the potential equivalent to the potential VDD−Vt. Therefore, the potential VoH does not constantly stay at the potential of the power source VDD as does in the buffer circuit with the conventional circuit (FIG. 14). The above-described voltage VoH is applied between the gate and cathode of the non-light emitting thyristor. Therefore, the overvoltage stress that is constantly applied to the thyristor is reduced as the voltage VDD is made below the power source voltage VDD, thereby preventing the degradation of elements.

Figure 20:
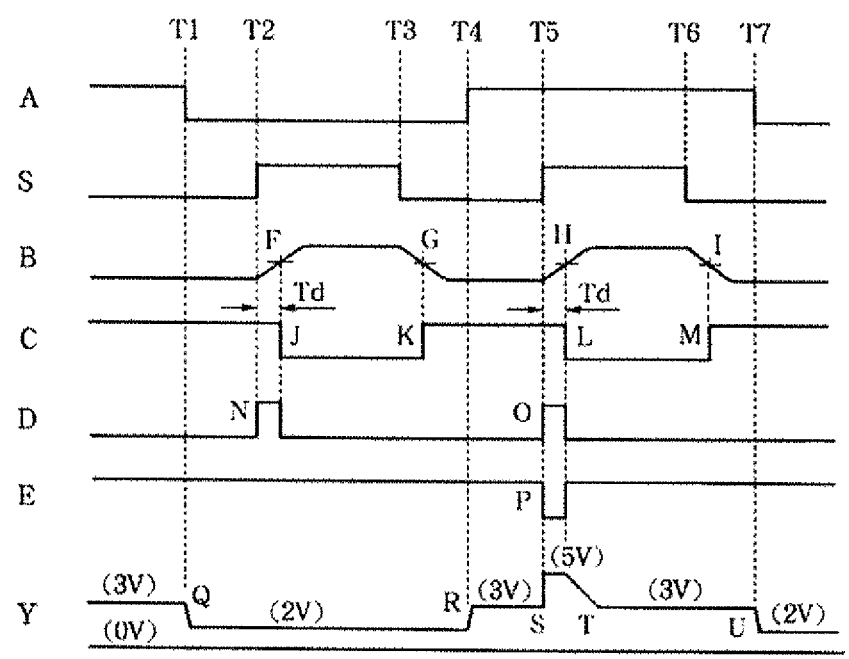
FIG. 20 is a time chart explaining an operation of the buffer circuit shown in FIG. 13B.

(Operation of Buffer Circuit) FIG. 20 is a time chart explaining an operation of the buffer circuit 401 shown in FIG. 13B. FIG. 20 corresponds to the operation of the print data part (around parts W and X) in the time chart shown in FIG. 14. The input terminal S of the buffer circuit 401 is connected to the output terminal of the NAND circuit 114 in FIG. 6 and receives the signal DRVON-P that instructs the driving of the thyristor. The input terminal A of the buffer circuit 401 is receives the data selection signal S1N. In addition, the waveform at each part shown in FIG. 20, that is, the waveforms A-E, S and Y indicate the waveforms of the signals at parts A-E, S and Y shown in FIG. 13B, respectively.

In FIG. 20, the input terminal signal A rises at time T1, falls at time T4 and again rises at time T7. In addition, the input terminal signal S rises at time T2, falls at time T3, rises at time T5 and falls at time T6. As the input terminal signal S rises and then falls, the potential at the point B forms a soft waveform shown in FIG. 20 due to the operation of the delay circuit 412.

When the threshold potentials at the inverter circuit 415 are indicated by parts F, G, H and I, the waveforms indicated with parts J, K, L and M are generated at the output C of the inverter circuit 415. Between the waveforms of the signals S and C, not only a logic inversion but also delay time indicated by Td is provided. The delay time Td is set by the resistance value of the resistor 413 and the capacitance of the capacitor 414 inside the delay circuit 412. The above-described signals S and C are inputted to the AND circuit 416, which generates the signal D as an output. As indicated at parts N and O of the signal D, a positive pulse having a pulse width Td is generated at a location corresponding to the rising edge of the signal S. The signal D is inputted to the NAND circuit 417. As indicated at part E of the signal E, a negative pulse having the pulse width Td is generated at a location corresponding to the part O.

When the point E in FIG. 13B is turned to the L level, the PMOS transistor 418 turns on. The output terminal Y rises to the H level and becomes a potential that is approximately equivalent to the power source voltage VDD.

The waveform at the output terminal Y shown in FIG. 20 is described in detail. When the input terminal A is at the H level, and when the input terminal S is at the L level, which occur in the initial state of the time chart, the PMOS transistor 418 is in the OFF state, and the NMOS transistor 419 is in the ON state. Therefore, the output terminal Y rises to the H level as described above. However, the potential is approximately 3 V in the typical design example in which the power source voltage is 5 V.

Next, the input terminal A falls to the L level at time T1. As a result, the PMOS transistor 304 shown in FIG. 13B turns on as described above. The output terminal Y shifts to the L level. Therefore, the potential falls to approximately 2 V in the typical design example (part Q).

When the input terminal rises to the H level at time T4, the output terminal again rises to the H level, and the potential increases to approximately 3 V (part R).

When the input terminal S rises to the H level at time T5, the PMOS transistor 418 is momentarily turned on as a result of the negative pulse at the point E in FIG. 13B. The potential at the output terminal Y rises to approximately 5 V as indicated at part S and is again turned to the H level state at approximately 3 V as indicated at part T after the delay time Td elapses.

Next, the input terminal falls to the L level at time T7. As a result, the PMOS transistor 304 in FIG. 13B turns on. The output terminal Y shifts to the L level, and the potential drops to approximately 2 V (part U).

As discussed above, the potential at the output terminal Y becomes low (2 V) in the period in which the gate is driven at the potential at the output terminal Y (period in which the potential of the gate is set to a potential for turning on the thyristor). The potential at the output terminal Y becomes high (3 or 5 V) in the period in which the gate is not driven at the potential at the output terminal Y (period in which the potential of the gate is set to a potential for not turning on the thyristor). In the period in which the gate is not driven, the potential becomes relatively high (5 V) when the anode current of the thyristor rises, and the potential becomes relatively low (3 V) in the other time. As a result, the thyristor of which the gate is not driven is prevented from being turned on by error, and the high voltage is not applied between the gates of the thyristors for a long period of time after turning on the thyristors. Therefore, the degradation of the thyristors is prevented.

Figure 21A:
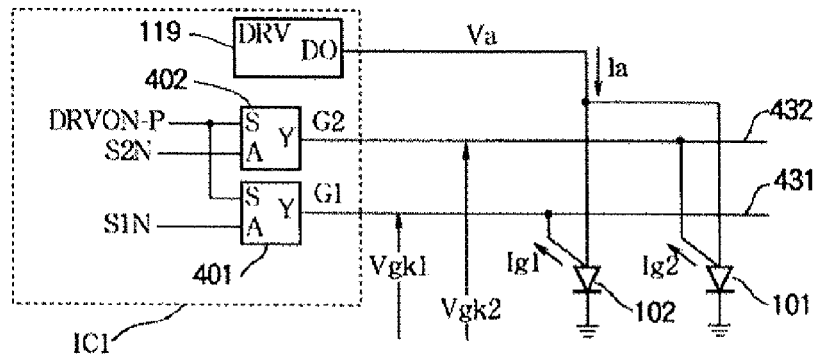
FIG. 21A is a model diagram illustrating the configuration shown in FIG. 2, which is simplified with adjacent light emitting thyristors.
Figure 21B:
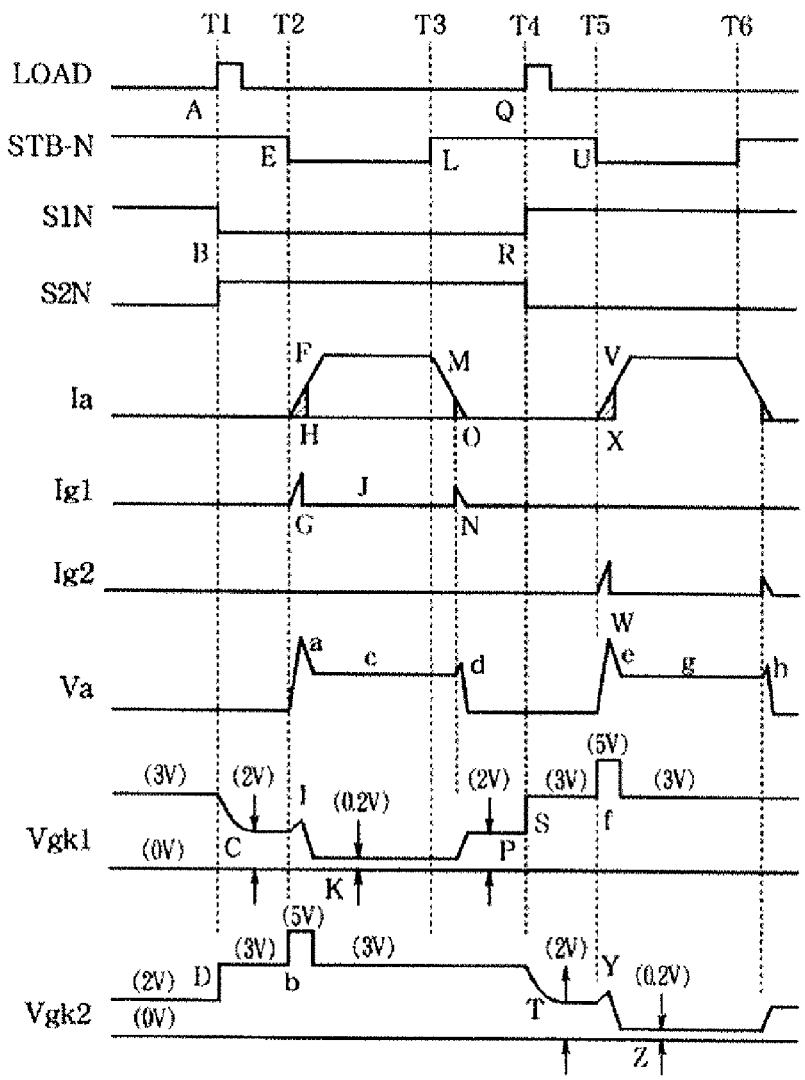
FIG. 21B is a time chart illustrating a driving state of the light emitting thyristors shown in FIG. 2 according to the first embodiment.

(Explanation of Driving Waveform) FIG. 21B is a time chart that illustrates a state of driving the thyristor shown in FIG. 2. FIG. 21A is a model diagram illustrating the configuration shown in FIG. 2, which is simplified by two adjacent light emitting thyristors (101 and 102). The symbol IC1 indicated by broken lines in FIG. 21A is a driver IC and simplifies the driver IC IC1 shown in FIG. 2. The anode driving circuit 119 is shown as DRV, and the output terminal is shown as DO. In addition, the buffer circuits 401 and 402 are the gate driving buffer circuits for the thyristors (FIG. 13). The data selection signal S1N and S2N are inputted to the input terminal S. The outputs of the buffer circuits 401 and 402 are transmitted from the terminals G1 and G2, respectively.

The terminal G1 and G2 are respectively connected to the common buses 431 and 432. The driving command signal DRVON-P is inputted to the input terminals S of the buffer circuits 401 and 402. The driving command signal DRVON-P is generated from the strobe signal STB-N and is described in FIG. 21B using the signal STB-N, which is a logically inverted signal of the signal DRVON-P.

The anode terminals of the thyristors 101 and 102 are connected to the terminal DO of the IC1. The gate terminals are respectively connected to the terminals G1 and G2.

The terminals G1 and G2 are respectively connected to the common buses 431 and 432 and are connected to the gate terminals of a plurality of the thyristors. However, in FIG. 21A, only a pair of the thyristors is shown. In addition, in FIG. 21A, the driving current via the terminal DO is indicated as a symbol Ia, and the gate current of the thyristors 102 and 101 are indicated as symbols Ig1 and Ig2. Moreover, the symbols Vgk1 and Vgk2 are voltage between the gate and cathode of the thyristors 102 and 101 and correspond to the waveforms (Y in FIG. 20) for the terminals G1 and G2.

FIG. 21B is a time chart for explaining the operation shown in FIG. 21A and illustrates states for driving the thyristors 102 and 101 by time division.

The signal LOAD is a latch signal that corresponds to the signal HD-LOAD shown in FIG. 2. The signal STB-N is a negative logic strobe signal that corresponds to the signal HD-STB-N and is inputted to the terminal STB shown in FIG. 6. The data selection signals S1N and S2N are memory selection signals generated from the multiplexer control circuit (CTRL2) 116 shown in FIG. 6. The gate driving signals G1 and G2 of the thyristors are generated by inputting the data selection signals S1N and S2N to the buffer circuits 401 and 402, respectively.

In FIG. 21B, the initial state is set when the signal HSYNC-N (not shown) is inputted, by which the data selection signals S1N and S2N are turned to the H level and L level, respectively. By inputting the data selection signals S1N and S2N to the buffer circuits 401 and 402, the output signals G1 and G2 are set high and low respectively.

Regarding the potentials of the gate driving signals G1 and G2 at this time, the H level (VoH) is the potential that is the power source potential VDD less the voltage Vgs between the gate and source of the NMOS transistor 419 (VDD-Vgs) in the configuration shown in FIG. 13B. The L level (VoL) corresponds to the voltage Vgs between the gate and source of the PMOS transistor 304. The voltage between the gate and source is a value that is slightly larger than the threshold voltage Vt. The voltage Vgs between the gate and source can be changed by adjusting the gate length of the PMOS transistor, the gate width of the PMOS transistor, or the substrate bias voltage between the source and substrate terminals of the PMOS transistor. As a schematic design example, when the power source voltage VDD is 5 V (VDD=5 V) and when the voltage Vgs is 2 V (Vgs=2 V), the H level voltage VoH is 3 V (VoH=3 V), and the L level voltage VoL is 2 V (VoL=2 V). The exemplary values are described in FIG. 21B.

In FIG. 21B, when the signal LOAD is inputted at part A at time T1, the data selection signals S1N and S2N shift to the L and H levels, respectively, as indicated part B. As a result, the potential VgK1 falls from approximately 3 V to approximately 2 V as indicated at part C. The potential Vgk2 increases from approximately 2 V to approximately 3 V as indicated at part D. Near the waveforms of the potentials Vgk1 and Vgk2, ground potential is indicated as "0 V."

Next, the signal STB-N is generated to instruct the thyristor 102 to turn on at time T2 and falls to the L level as indicated at part E, and the anode current Ia rises as indicated at part F.

As explained using FIGS. 19A-19E, in the process for turning on the thyristor 102, the current Ia that flows in from the anode terminal out from the gate terminal becomes the gate current Ig, which causes the thyristor to transits to the ON state. In FIG. 21B, the hatched part of the rising waveform of the anode current Ia, which corresponds to part H, becomes the waveform for the gate current Ig1 indicated at part G. At this time, as explained using FIGS. 19A-19E, the anode potential of the thyristors 102 and 101, which is indicated by the waveform Va, rises to the peak during the transitions for turning on or off the thyristor, that is, when the gate current Ig1 or Ig2 flows.

At this time, if the gate potential at the non-light emitting thyristor is not high enough, the gate current occurs at the non-light emitting thyristor due to the peak value of the anode potential Va, possibly causing a malfunction. However, as discussed below, because the gate potential of the thyristor momentarily rises at the above-described timing in the buffer circuit with the configuration shown in FIG. 13B, such a malfunction is prevented from occurring.

Returning to FIG. 21B, as the gate current Ig1 flows at part G, although the output terminal potential (Vgk1) of the buffer circuit 401 slightly rises as indicated at part I, the gate potential (output terminal potential Vgk1) decreases to approximately 0.2 V as indicated at part K in accordance with the turning on of the thyristor 102, due to the driving ability of thyristor itself. The 0.2 V corresponds to the saturation voltage Vce(sat) between the collector and emitter of the NPN transistor 142 as discussed in FIG. 19B.

At this time, the gate current Ig1 turns on the thyristor 102 to emit light. The gate terminal potential Vgk2 of the thyristor 101 initially rises to the H level at approximately 3 V. Then, at the front edge timing of the strobe signal (STB-N), the gate terminal potential Vgk2 becomes a potential at approximately 5 V.

Therefore, the anode terminal potential Va may be turn to a momentary peak state as indicated at part a, but the gate current Ig2, which flows from the anode terminal to the gate terminal, is not generated. As a result, the thyristor 101 remains in a non-light emitting state.

Next, the signal STB-N rises to the H level at time T3 (part L). As a result, the anode current Ia falls and decreases as indicated at part M. When the anode current Ia falls below the holding current, which is determined by the characteristics of the thyristor, the thyristor 102 is turned off, and the gate current Ig1 is generated in accordance of the increase of the anode potential (part N).

The gate current Ig1 at part N is generated by the anode current at part O and corresponds to the current at part N as indicated by hatching. As the gate current disappears at part N, the thyristor 102 is turned off, and the voltage Vgk1 between the gate and cathode rises as indicated at part P and becomes a potential at approximately 2 V, which is the L level output voltage VoL of the buffer circuit 401 itself.

Next, at time T4, the signal LOAD is inputted as indicated at part Q, and the data selection signal S1N rises to the H level, and the data selection signal S2N falls to the L level (part R). Resultantly, the gate driving signal G1 rises to the H level, and the gate driving signal G2 falls to the L level. However, as discussed above, the H level output (VoH) of the buffer circuit 401 is approximately 3 V as indicated at part S and does not rise to the power source voltage VDD. In addition, the potential Vgk2 decreases to approximately 2 V as indicated at part T.

Thereafter, the signal STB-N falls to the L level at time T5 as indicated at part U. At this time, the anode current Ia is again generated and rises as indicated at part V.

As described using FIGS. 19A-19E, the current that flows in from the anode terminal in the process for turning on the thyristor becomes the gate current as the current flows out from the gate terminal. As a result, the thyristor 101 is turned on.

In FIG. 21B, a part of the gate current Ig2 of the thyristor 101, which corresponds to part Z of the rising waveform the anode current Ia that is hatched, generates a current waveform indicated at part W.

As the gate current Ig2 flows, although the output terminal potential (Vgk2) of the buffer circuit 402 slightly rises as indicated at part Y, the gate potential (output terminal potential Vgk2) is decreases to approximately 0.2 V as indicated at part Z in accordance with the turning on of the thyristor 102. The 0.2 V corresponds to the saturation voltage Vce(sat) between the collector and emitter of the NPN transistor 142 as discussed in FIG. 19B.

At this time, the gate current Ig2 turns on the thyristor 101 to emit light. The gate terminal potential Vgk1 of the thyristor 102 initially rises to the H level at approximately 3 V. Then, before the anode terminal potential Va reaches to a peak value as indicated at part e, the gate terminal potential Vgk1 becomes a potential at approximately 5 V. Even if the anode terminal potential Va turns to the peak state, the gate current Ig1, which flows from the anode terminal to the gate terminal, is not generated. As a result, the thyristor 102 remains in a non-light emitting state.

As described above, for the thyristors 102 and 101 shown in FIG. 21A, the thyristor element subject to turn on is selected by switching the gate driving signals G1 and G2 to the H and L levels, and the other element is maintained in the non-light emitting state. As shown in FIG. 21B, the thyristor 102 is turned to the ON state with the strobe signal at part E, and the thyristor 101 is in the OFF state. The thyristor 101 is turned on with the strobe signal at part U, and the thyristor 102 is turned off.

As apparent from the above explanations, when turning on the thyristor, the thyristor is driven by the anode current Ia, and the light emission output is determined by the current value. Therefore, the anode current Ia is set to zero when it is not necessary to turn on the thyristors. To do so, the print data (parts U and V in FIG. 14) needs to be set to the OFF state.

As apparent from the above explanations, the delay time Td (see FIG. 20) by the delay circuit 412 in FIG. 13B is set to include a pulse width of the gate currents Ig1 and Ig2 in FIG. 21B, that is, the time during which the anode potential Va reaches the peak at part a and part e in FIG. 21B. Therefore, the delay circuit functions as a timing control circuit.

(Advantage of First Embodiment) In the above-described driving by time division, the gate terminal of the thyristor to emit light (to be in the ON state) is at the L level, and the gate terminal of the thyristor not to emit light (to be in the OFF state) is at the H level. The driver IC is fabricated using a CMOS process, and the power source voltage of the driver IC is 5 V. In the gate driving circuit including a conventional configuration, the H level potential is 5 V, which is approximately equivalent to the power source potential. However, only approximately 7 V can be secured for the withstand voltage for the thyristor, which is not large enough. Therefore, the thyristor may be damaged due to the applied H level voltage.

In contrast, in the gate driving circuit including the configuration of the first embodiment (FIG. 13B), the H level voltage can be at a lower value than 5 V for the power source voltage. As a result, the voltage between the gate and cathode of the thyristor in the non-light emitting state can be below the withstand voltage value of the thyristor, thereby preventing the above-described damage from occurring.

In addition, the anode potential reaches its peak in the process for turning on the thyristor. However, by keeping the gate terminal of the non-light emitting side thyristor to the VDD potential for time including the timing for the peak of the anode potential, the gate current that flows from the anode terminal to the gate terminal of the non-light emitting side thyristor is not generated even if the anode terminal potential reaches the peak. As a result, turning on the non-light-emitting side thyristor by error is prevented from occurring.

(Second Embodiment: Configuration of Gate Driving Buffer Circuit) The configuration of the second embodiment is approximately the same as that of the first embodiment. However, the configuration of the second embodiment is different in that the buffer circuits 501 and 502 are used instead of the buffer circuits 401 and 402 shown in FIG. 6. Because the buffer circuits 501 and 502 include the same configuration, the explanation is made with the buffer circuit 501 below.

Figures 22A, 22B:
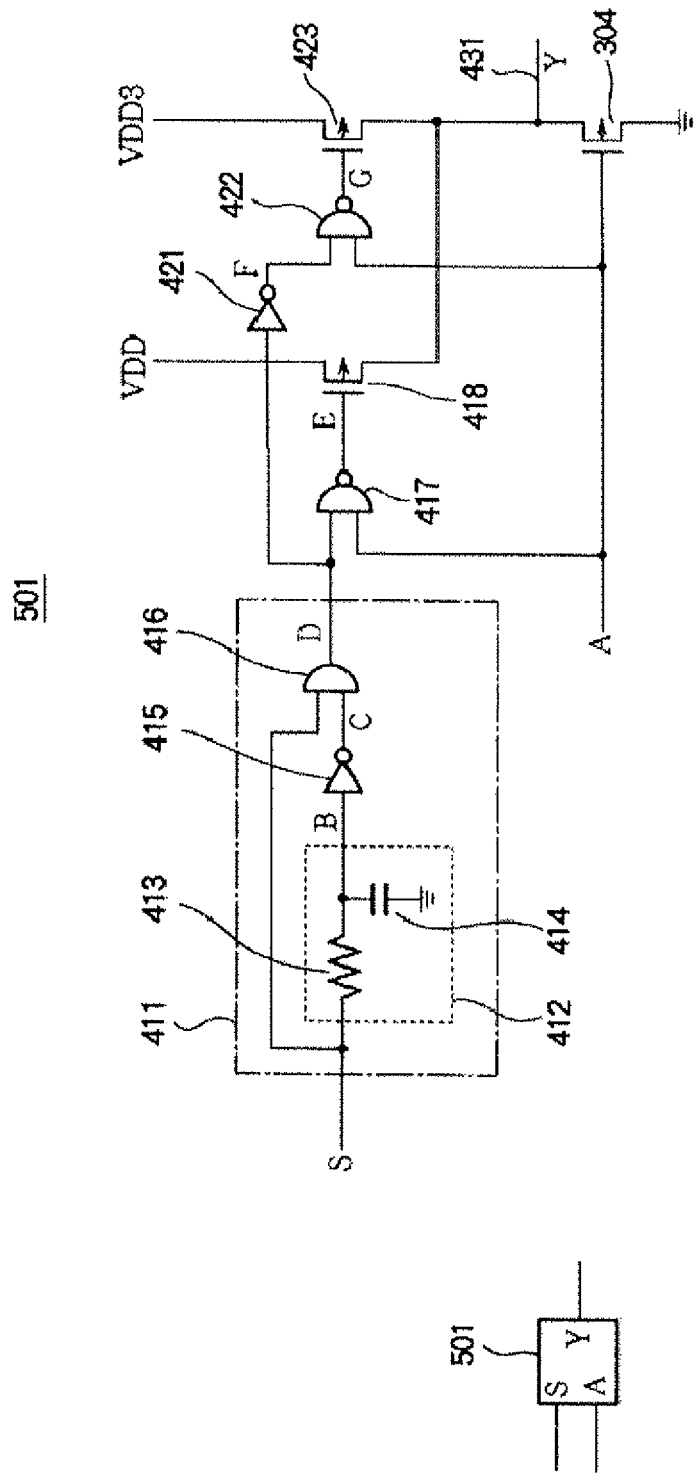
FIGS. 22A and 22B illustrate a configuration of a driving buffer used in the second embodiment.

FIGS. 22A and 22B show a configuration of the buffer circuit 501 according to the second embodiment. FIG. 22A illustrates circuit symbols for the buffer circuit 501, and FIG. 22B is a circuit diagram illustrating a circuitry of the buffer circuit 501. The buffer circuit 501 shown in FIG. 22B includes the front edge detection circuit 411, the NAND circuits 417 and 422, the PMOS transistors 418, 423 and 304, and the inverter circuit 421. Similar to the buffer circuit 401 shown in FIG. 13B, the front edge detection circuit 411 is a circuit that generates an H level pulse only for a predetermined length of time after the input signal rises and includes the delay circuit 412, the inverter circuit 415 and the AND circuit 416. The delay circuit 412 includes the resistor 413 and the capacitor 414.

The input terminal S of the buffer circuit 501 is connected to the input terminal of the delay circuit 412. The input terminal of the delay circuit 412 is connected to one end of the capacitor 414 via the resistor 413. The other end of the capacitor is connected to ground. In addition, the output terminal of the delay circuit 412 is connected to the input terminal of the inverter circuit 415. One of the input terminals of the AND circuit 416 is connected to the input terminal S of the buffer circuit 501. The other input terminal of the AND circuit 416 is connected to the output terminal of the inverter circuit 415. The output terminal of the AND circuit 416 is connected to one of the input terminals of the NAND circuit 417. The other input terminal of the NAND circuit 417 is connected to the input terminal A of the buffer circuit 501.

The output terminal of the NAND circuit 417 is connected to the gate terminal of the PMOS transistor 418. The source of the PMOS transistor 418 is connected to the power source VDD. The drain terminal of the PMOS transistor 418 is connected to the output terminal Y of the buffer circuit 501. In addition, the output terminal of the AND circuit 416 is connected to one of the input terminals of the NAND circuit 433 via the inverter circuit 421. The other input terminal of the NAND circuit 422 is connected to the input terminal A of the buffer circuit 501.

The source terminal of the PMOS transistor 423 is connected to the power source VDD3. The gate terminal of the PMOS transistor 423 is connected to the output terminal of the NAND circuit 422. The drain terminal of the PMOS transistor 423 is connected to the output terminal Y of the buffer circuit 501.

The source terminal of the PMOS transistor 304 is connected to the output terminal Y of the buffer circuit 501. The drain terminal of the PMOS transistor 304 is connected to ground. The gate terminal of the PMOS transistor 304 is connected to the input terminal A of the buffer circuit 501.

The power source VDD is 5 V in the typical design example using the configuration shown in FIG. 22B. 2.5 V, which is lower than the power source VDD, is selected as the power source VDD3 and is used as an example in the present embodiment. However, 3.3 V or other voltage may be used as the voltage VDD3, of course.

In the figures, a capacitor-resister (CR) delay circuit formed from the resistor 413 and the capacitor 414 is shown as an example of the delay circuit 412. However, the circuit is not limited to this formation. The delay circuit 412 may be formed from different configuration, such as a configuration including an even number of inverter circuits that are connected in a cascade or other variations.

As a result, although the output terminal Y turns to the H level, the potential VoH at the output terminal Y is at the potential of the power source voltage VDD3. Therefore, the potential VoH does not constantly stay at the potential of the power source VDD as does in the buffer circuit with the conventional circuit (FIG. 14).

The above-described voltage VoH is applied between the gate and cathode of the non-light emitting thyristor. Therefore, the overvoltage stress that is constantly applied to the thyristor is reduced as the voltage VDD is made below the power source voltage VDD, thereby preventing the degradation of elements.

Figure 23:
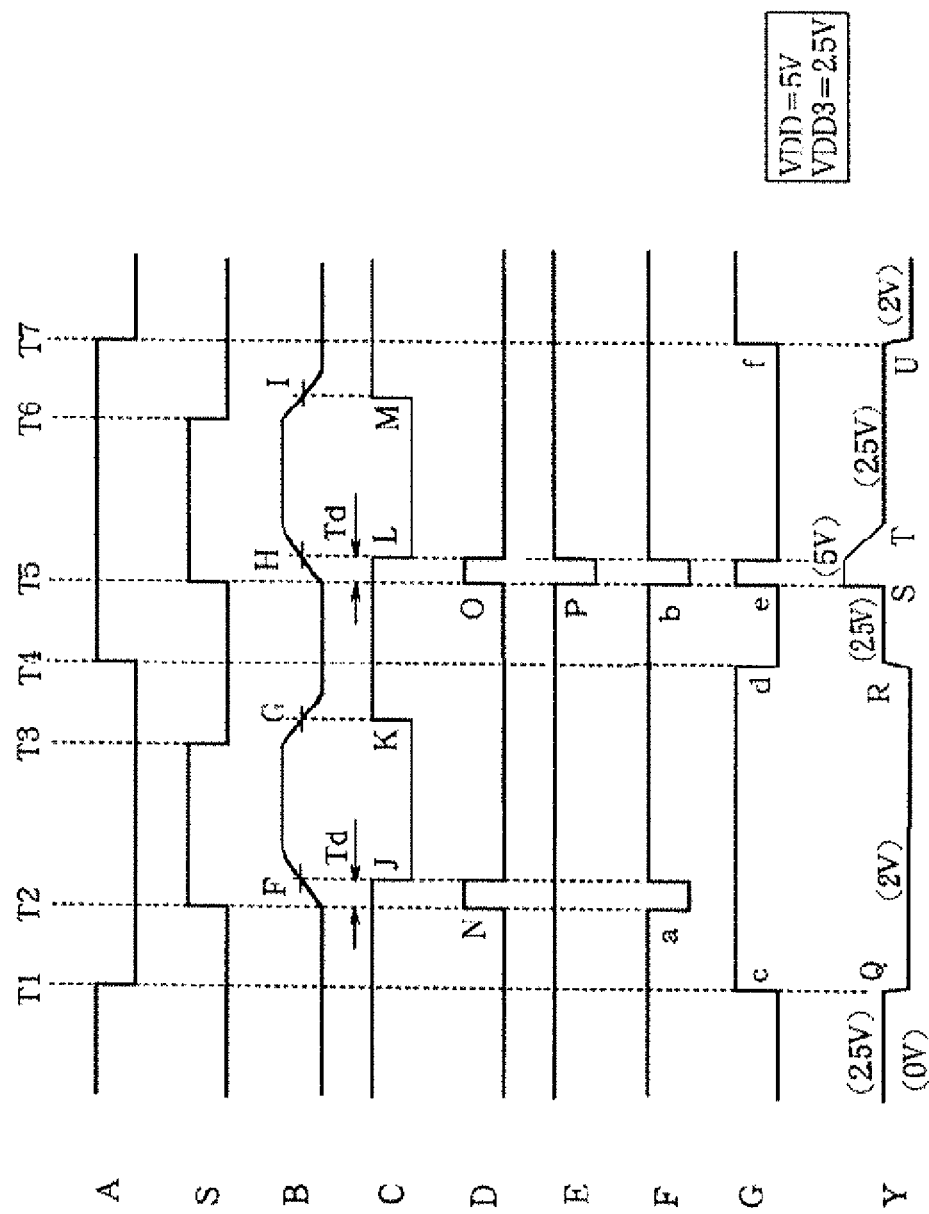
FIG. 23 is a time chart explaining an operation of the buffer circuit shown in FIG. 22B.

(Operation of Buffer Circuit) FIG. 23 is a time chart explaining an operation of the buffer circuit 501 shown in FIG. 22B. FIG. 23 corresponds to the operation of the print data part (around parts W and X) in the time chart shown in FIG. 14. The input terminal S of the buffer circuit 501 is connected to the output terminal of the NAND circuit 114 in FIG. 6 and receives the signal DRVON-P that instructs the driving of light emission of the thyristor. The input terminal A of the buffer circuit 501 is receives the data selection signal S1N. In addition, the waveform at each part shown in FIG. 23, that is, the waveforms A-G, S and Y indicate the waveforms of the signals at parts A-G, S and Y shown in FIG. 13B, respectively.

In addition, similarly, in the buffer circuit 502, the input terminal S of the buffer circuit 401 is connected to the output terminal of the NAND circuit 114 in FIG. 6 and receives the signal DRVON-P that instructs the driving of the thyristor. The input terminal A of the buffer circuit 401 is receives the data selection signal S1N. The terminals G1 and G2 are connected to the common buses 431 and 432 shown in FIG. 2, respectively.

In FIG. 23, the input terminal signal A rises at time T1, falls at time T4 and again rises at time T7. In addition, the input terminal signal S rises at time T2, falls at time T3, rises again at time T5 and falls at time T6. As the input terminal signal S rises and then falls, the potential at the point B forms a soft waveform shown in FIG. 23 due to the operation of the delay circuit 412.

When the threshold potentials at the inverter circuit 415 are indicated parts F, G, H and I, the waveforms indicated with parts J, K, L and M are generated at the output C of the inverter circuit 415. Between the waveforms of the signals S and C, not only a logic inversion but also the delay time Td is provided. This delay time Td is set by the resistance value of the resistor 413 and the capacitance of the capacitor 414 inside the delay circuit 412.

The above-described signals S and C are inputted to the AND circuit 416, which generates the signal D as an output. As indicated at parts N and O of the signal D, a positive pulse having a pulse width Td is generated at a location corresponding to the rising edge of the signal S. The signal D is inputted to the NAND circuit 417. As indicated at part E of the signal E, a negative pulse having the pulse width Td is generated at a location corresponding to the part O.

When the signal E is at the H level, the PMOS transistor 418 is in the OFF state. When the signal E falls to the L level, the PMOS transistor 418 is turned to the ON state. As a result, the drain potential becomes the potential of the power source VDD (approximately 5V). On the other hand, when the signal D is inputted to the inverter circuit 421, the logic of the waveform of the signal D is inverted, and the output signal F (point F in FIG. 22B) is generated from the inverter circuit 421. The signal F includes negative pulses as indicated by parts a and b.

The output signal of the inverter circuit 421 is inputted to one of the input terminals of the NAND circuit 422. The output signal G of the NAND circuit 422 raises at part c, falls at part d and rises at part f. The output signal G also includes a positive pulse including a pulse width Td generated at part e.

When the point G in FIG. 22 (signal G in FIG. 23) is at the H level, the PMOS transistor 423 is in the OFF state. When the point G falls to the L level, the PMOS transistor 423 is turned to the ON state. As a result, the drain terminal reaches the potential (2.5 V) that is approximately equivalent to the power source VDD3.

The waveform at the output terminal Y of the buffer circuit 501 shown in FIG. 23 is described in detail. When the input terminal A is at the H level, and when the input terminal S is at the L level, which occur in the initial state of the time chart, the PMOS transistor 418 is in the OFF state, and the PMOS transistor 423 is in the ON state. Therefore, the output terminal Y rises to the H level as described above. However, the potential is 2.5 V, which is approximately equivalent to the power source voltage VDD3.

Next, the input terminal A falls to the L level at time T1. As a result, the PMOS transistor 304 shown in FIG. 22B turns on as described above. The output terminal Y shifts to the L level. Therefore, the potential falls to approximately 2 V in the typical design example (part Q).

When the input terminal rises to the H level at time T4, the PMOS transistor 304 is turned off, and the PMOS transistor 423 is turned on. Therefore, the output terminal again rises to the H level, and the potential increases to approximately 2.5 V (part R).

When the input terminal S rises to the H level at time T5, the PMOS transistor 418 is momentarily turned on as a result of the negative pulse at the point E in FIG. 22B (part P in FIG. 23). The potential at the output terminal Y rises to approximately 5 V as indicated at part S and is again turned to the H level state at approximately 2.5 V as indicated at part T after the delay time Td elapses.

Next, the input terminal falls to the L level at time T7. As a result, the PMOS transistor 304 in FIG. 22B turns on, and the PMOS transistor 423 turns off. The output terminal Y shifts to the L level, and the potential drops to approximately 2 V (part U).

Figure 24A:
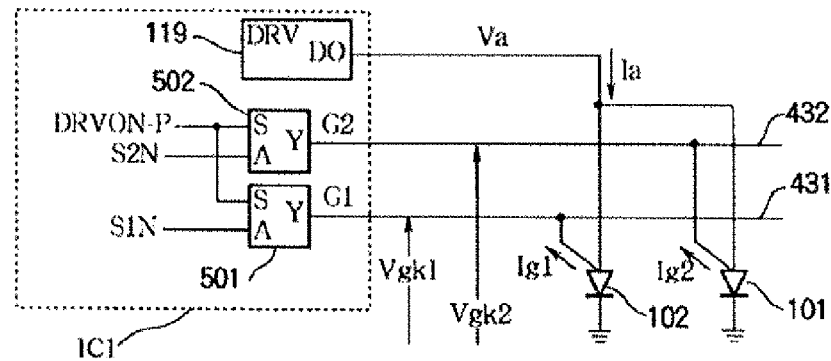
FIG. 24A is a model diagram illustrating the configuration shown in FIG. 2, which is simplified with adjacent light emitting thyristors.
Figure 24B:
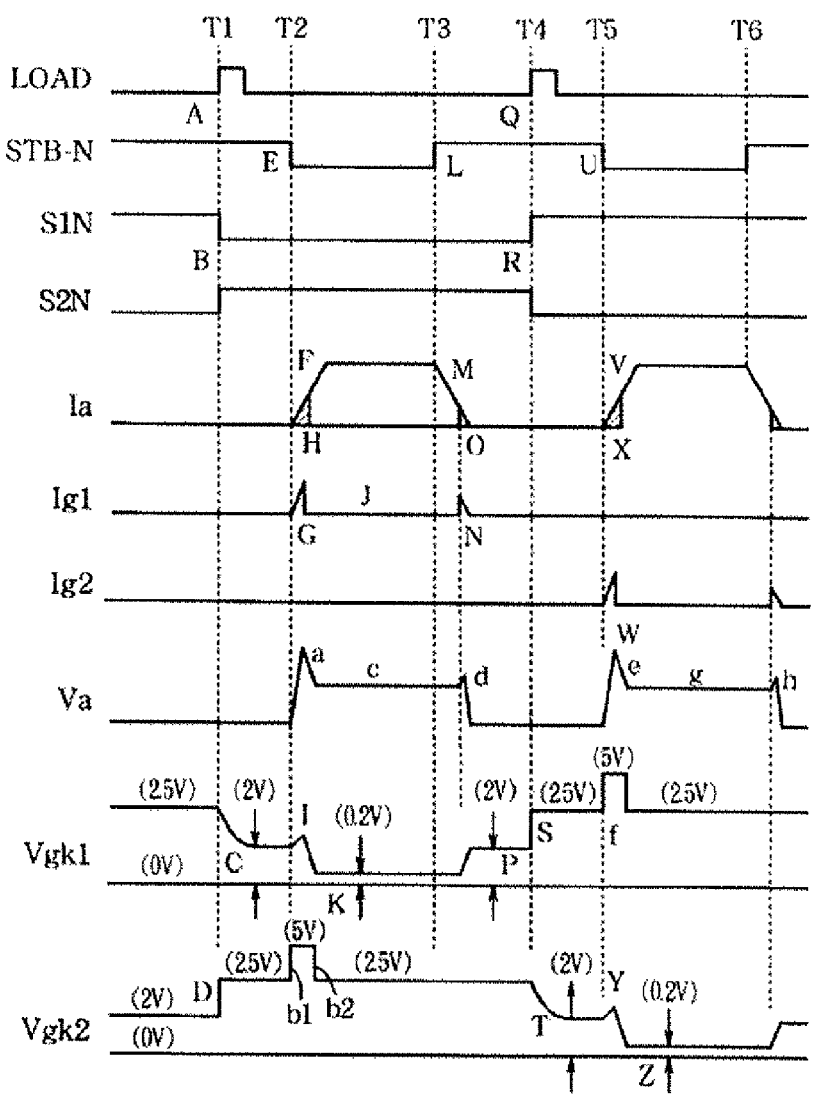
FIG. 24B is a time chart illustrating a driving state of the light emitting thyristors shown in FIG. 2 according to the second embodiment.

(Explanation of Driving Waveform) FIG. 24B is a time chart that illustrates a state of driving the thyristor shown in FIG. 2 according to the second embodiment. FIG. 24A is a model diagram illustrating the configuration shown in FIG. 2, which is simplified by two adjacent light emitting thyristors (101 and 102).

The symbol IC1 indicated by broken lines in FIG. 24A is a driver IC and simplifies the driver IC IC1 shown in FIG. 2. The anode driving circuit 119 is shown as DRV, and the output terminal is shown as DO.

In addition, the buffer circuits 501 and 502 are the gate driving buffer circuits for the thyristors as discussed in the second embodiment (FIG. 22). The data selection signal S1N and S2N are inputted to the input terminal S. The outputs of the buffer circuits 501 and 502 are transmitted from the terminals G1 and G2, respectively.

The driving command signal DRVON-P is inputted to the input terminals S of the buffer circuits 501 and 502. The driving command signal DRVON-P is generated from the strobe signal STB-N and is described in FIG. 24B using the signal STB-N, which is a logically inverted signal of the signal DRVON-P.

The anode terminals of the thyristors 101 and 102 shown in FIG. 24A are connected to the terminal DO of the IC1. The gate terminals are respectively connected to the terminals G1 and G2. The terminals G1 and G2 are respectively connected to the common buses 431 and 432 and are connected to the gate terminals of a plurality of the thyristors. However, in FIG. 24A, only a pair of the thyristors is shown. In addition, in FIG. 24A, the driving current via the terminal DO is indicated as a symbol Ia, and the gate current of the thyristors 102 and 101 are indicated as symbols Ig1 and Ig2. Moreover, the symbols Vgk1 and Vgk2 are voltage between the gate and cathode of the thyristors 102 and 101 and correspond to the waveforms (Y in FIG. 20) for the terminals G1 and G2.

FIG. 24B is a time chart for explaining the operation shown in FIG. 24A and illustrates states for driving the thyristors 102 and 101 by time division.

The signal LOAD is a latch signal that corresponds to the signal HD-LOAD shown in FIG. 2. The signal STB-N is a negative logic strobe signal that corresponds to the signal HD-STB-N and is inputted to the terminal STB shown in FIG. 6. The data selection signals S1N and S2N are memory selection signals generated from the multiplexer control circuit (CTRL2) 116 shown in FIG. 6. The gate driving signals G1 and G2 of the thyristors are generated by inputting the data selection signals S1N and S2N to the buffer circuits 501 and 502, respectively.

In FIG. 24B, the initial state is set when the signal HSYNC-N (not shown) is inputted, by which the data selection signals S1N and S2N are turned to the H level and L level, respectively. By inputting the data selection signals S1N and S2N to the buffer circuits 501 and 502, the output signals G1 and G2 are set high and low respectively.

Regarding the potentials of the gate driving signals G1 and G2 at this time, the H level (VoH) is the potential of the power source potential VDD3 in the configuration shown in FIG. 22B. FIG. 24B illustrates, as an example, a case in which the voltage VDD3 is 2.5 V. In addition, the L level (VoL) corresponds to the voltage Vgs between the gate and source of the PMOS transistor 304. The voltage between the gate and source is a value that is slightly larger than the threshold voltage Vt. The voltage Vgs between the gate and source can be changed by adjusting the gate length of the PMOS transistor, the gate width of the PMOS transistor, or the substrate bias voltage between the source and substrate terminals of the PMOS transistor. As a schematic design example, when the power source voltage VDD is 5 V (VDD=5 V) and when the voltage Vgs is 2 V (Vgs=2 V), the L level voltage VoL is 2 V (VoL=2 V). The exemplary values are described in FIG. 24B.

In FIG. 24B, when the signal LOAD is inputted at part A at time T1, the data selection signals S1N and S2N shift to the L and H levels, respectively, as indicated part B. As a result, the potential VgK1 falls from approximately 2.5 V to approximately 2 V as indicated at part C. The potential Vgk2 increases from approximately 2 V to approximately 2.5 V as indicated at part D. Near the waveforms of the potentials Vgk1 and Vgk2, ground potential is indicated as "0 V."

Next, the signal STB-N is generated to instruct the thyristor 102 to turn on the at time T2 and falls to the L level as indicated at part E, and the anode current Ia rises as indicated at part F.

As explained using FIGS. 19A-19E, in the process for turning on the thyristor 102, the current Ia that flows in from the anode terminal out from the gate terminal becomes the gate current Ig, which causes the thyristor to transits to the ON state. In FIG. 24B, the hatched part of the rising waveform of the anode current Ia, which corresponds to part H, becomes the waveform for the gate current Ig1 indicated at part G. At this time, as explained using FIGS. 19A-19E, the anode potential of the thyristors 102 and 101, which is indicated by the waveform Va, rises to the peak during the transitions for turning on or off the thyristor, that is, when the gate current Ig1 or Ig2 flows.

At this time, if the gate potential at the non-light emitting thyristor is not high enough, the gate current occurs at the non-light emitting thyristor due to the peak value of the anode potential Va, possibly causing a malfunction. However, as discussed below, because the gate potential of the thyristor momentarily rises at the above-described timing in the buffer circuit with the configuration shown in FIG. 22B, such a malfunction is prevented from occurring.

Returning to the explanation of FIG. 24B, as the gate current Ig1 flows at part G, although the output terminal potential (Vgk1) of the buffer circuit 501 slightly rises as indicated at part I, the gate potential (output terminal potential Vgk1) decreases to approximately 0.2 V as indicated at part K in accordance with the turning on of the thyristor 102, due to the driving ability of thyristor itself. The 0.2 V corresponds to the saturation voltage Vce(sat) between the collector and emitter of the NPN transistor 142 as discussed in FIG. 19B.

At this time, the gate current Ig1 turns on the thyristor 102 to emit light. The gate terminal potential Vgk2 of the thyristor 101 initially rises to the H level at approximately 2.5 V. Then, at the front edge timing of the strobe signal (STB-N), the gate terminal potential Vgk2 becomes a potential at approximately 5 V (part b1).

Therefore, the anode terminal potential Va may be turn to a momentary peak state as indicated at part a, but the gate current Ig2, which flows from the anode terminal to the gate terminal, is not generated. As a result, the thyristor 101 remains in a non-light emitting state.

After the above-described process for turning on the thyristor is completed, the gate terminal potential Vgk2 returns to the potential of approximately 2.5 V again from the potential of approximately 5 V after the delay time Td (part b2).

Next, the signal STB-N rises to the H level at time T3 (part L). As a result, the anode current Ia falls and decreases as indicated at part M. When the anode current Ia falls below the holding current, which is determined by the characteristics of the thyristor, the thyristor 102 is turned off, and the gate current Ig1 is generated in accordance of the increase of the anode potential (part N).

The gate current Ig1 at part N is generated by the anode current at part O and corresponds to the current at part N as indicated by hatching. As the gate current disappears at part N, the thyristor 102 is turned off, and the voltage Vgk1 between the gate and cathode rises as indicated at part P and becomes a potential at approximately 2 V, which is the L level output voltage VoL of the buffer circuit 401 itself.

Next, at time T4, the signal LOAD is inputted as indicated at part Q, and the data selection signal S1N rises to the H level, and the data selection signal S2N falls to the L level (part R). Resultantly, the gate driving signal G1 rises to the H level, and the gate driving signal G2 falls to the L level. However, as discussed above, the H level output (VoH3) of the buffer circuit 501 is approximately 2.5 V as indicated at part S and does not rise to the power source voltage VDD. In addition, the potential Vgk2 decreases to approximately 2 V as indicated at part T.

Thereafter, the signal STB-N falls to the L level at time T5 as indicated at part U. At this time, the anode current Ia is again generated and rises as indicated at part V.

As described using FIGS. 19A-19E, the current that flows in from the anode terminal in the process for turning on the thyristor becomes the gate current as the current flows out from the gate terminal. As a result, the thyristor 101 is turned on.

In FIG. 24B, a part of the gate current Ig2 of the thyristor 101, which corresponds to part X of the rising waveform the anode current Ia that is hatched, generates a current waveform indicated at part W.

As the gate current Ig2 flows, although the output terminal potential (Vgk2) of the buffer circuit 502 slightly rises as indicated at part Y, the gate potential (output terminal potential Vgk2) is decreases to approximately 0.2 V as indicated at part Z in accordance with the turning on of the thyristor 102. The 0.2 V corresponds to the saturation voltage Vce(sat) between the collector and emitter of the NPN transistor 142 as discussed in FIG. 19B.

At this time, the gate current Ig2 turns on the thyristor 101 to emit light. The gate terminal potential Vgk1 of the thyristor 102 initially rises to the H level at approximately 2.5 V. Then, before the anode terminal potential Va reaches to a peak value as indicated at part e, the gate terminal potential Vgk1 becomes a potential at approximately 5 V. Even if the anode terminal potential Va turns to the peak state, the gate current Ig1, which flows from the anode terminal to the gate terminal, is not generated. As a result, the thyristor 102 remains in a non-light emitting state.

As described above, for the thyristors 102 and 101 shown in FIG. 24A, the thyristor element subject to turn on is selected by switching the gate driving signals G1 and G2 to the H and L levels, and the other element is maintained in the non-light emitting state. As shown in FIG. 24B, the thyristor 102 is turned on with the strobe signal at part E, and the thyristor 101 is not turned on. The thyristor 101 is turned on with the strobe signal at part U, and the thyristor 102 is turned off.

As apparent from the above explanations, when turning on the thyristor, the thyristor is driven by the anode current Ia, and the light emission output is determined by the current value. Therefore, the anode current Ia is set to zero when it is not necessary to turn on the thyristors. To do so, the print data (parts U and V in FIG. 14) needs to be set to the OFF state.

As apparent from the above explanations, the delay time Td (see FIG. 23) by the delay circuit 412 in FIG. 22B is set to include a pulse width of the gate currents Ig1 and Ig2 in FIG. 24B, that is, the time during which the anode potential Va reaches the peak at parts a and e in FIG. 24B. Therefore, the delay circuit functions as a timing control circuit.

(Advantage of Second Embodiment) In the above-described driving by time division, the gate terminal of the thyristor to emit light (to be in the ON state) is at the L level, and the gate terminal of the thyristor not to emit light (to be in the OFF state) is at the H level. The driver IC is fabricated using a CMOS process, and the power source voltage of the driver IC is 5 V. In the gate driving circuit including a conventional configuration, the H level potential is 5 V, which is approximately equivalent to the power source potential. However, only approximately 7 V can be secured for the withstand voltage for the thyristor, which is not large enough. Therefore, the thyristor may be damaged due to the applied H level voltage.

In contrast, in the gate driving circuit including the configuration of the second embodiment (FIG. 22B), the H level voltage can be at a lower value than 5 V for the power source voltage. As a result, the voltage between the gate and cathode of the thyristor in the non-light emitting state can be below the withstand voltage value of the thyristor, thereby preventing the above-described damage from occurring.

In addition, the anode potential reaches its peak in the process for turning on the thyristor. However, by keeping the gate terminal of the non-light emitting side thyristor to the VDD potential for time including the timing for the peak of the anode potential, the gate current that flows from the anode terminal to the gate terminal of the non-light emitting side thyristor is prevented even if the anode terminal potential reaches the peak. As a result, turning on the non-light-emitting side thyristor by error is prevented from occurring.

(Exemplary Application: Tandem Color Printer) The optical light emitting array explained in the first and second embodiments may be used as a light source for the exposure process in an electrographic printer. An exemplary application is described with a tandem color printer below using FIG. 25.

Figure 25:
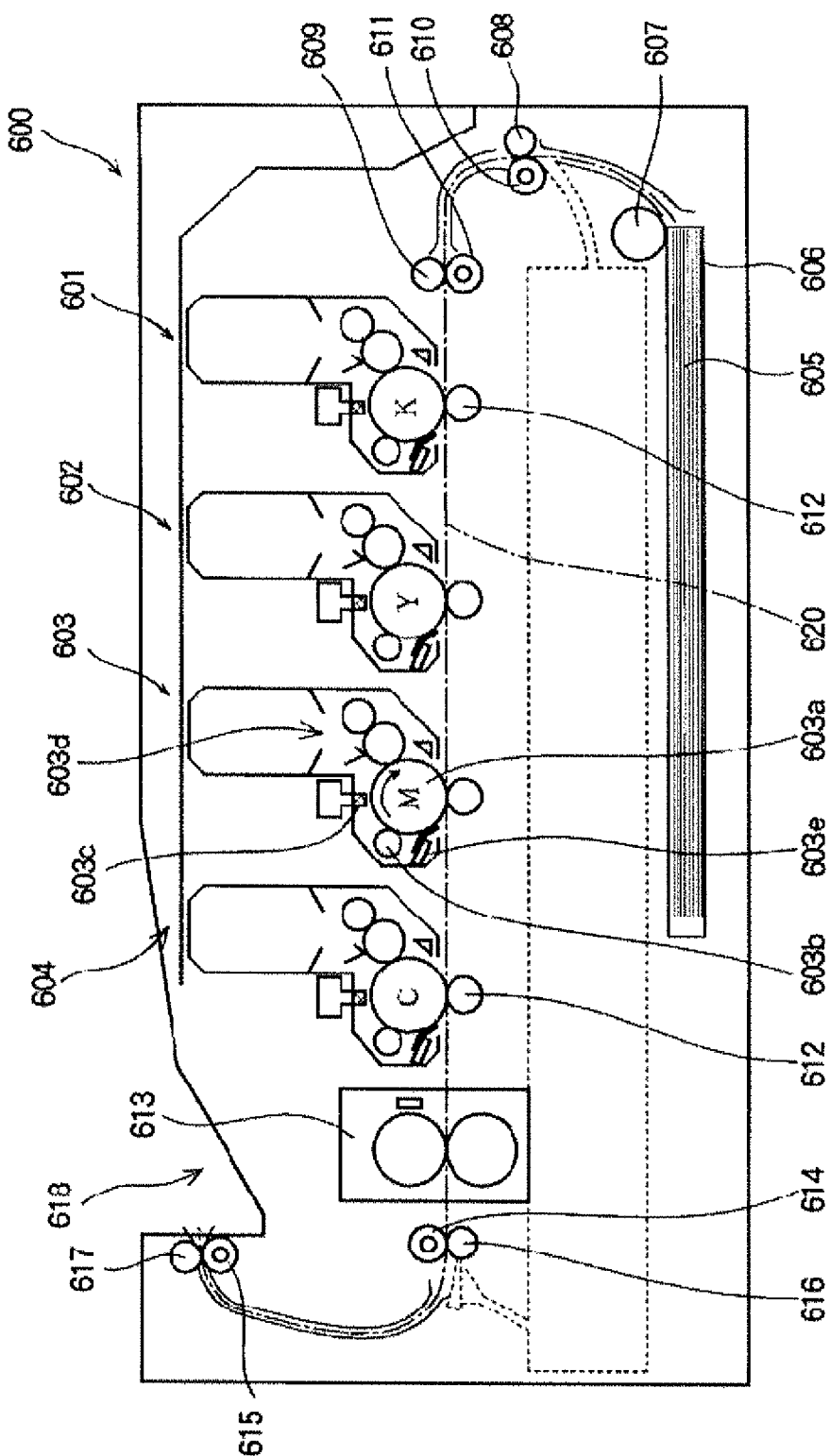
FIG. 25 is a schematic cross-sectional view explaining the image forming device that uses the optical print head including the driving circuit in the first or second embodiment.

FIG. 25 is a schematic cross-sectional view explaining the image forming device that uses the optical print head including the driving circuit in the first or second embodiment. In FIG. 25, the image forming device 600 includes four process units 601-604, which form images in black (K), yellow (Y), magenta (M) and cyan (C), respectively. The process units 601-604 are sequentially arranged from the upstream side of a carrying path of a recording medium 605. Because the internal configuration of the process units 601-604 is the same, the internal configuration of the magenta process unit 603, for example, is explained as an example.

In the process unit 603, a photosensitive drum 603a, which functions as an image carrier, is arranged rotatably in the direction of an arrow. Around the photosensitive drum 603a, a charge device 603b, an exposure device 603c, a developing device 603d and a cleaning device 603e are provided in order from the upstream side of the rotational direction.

The charge device 603b supplies electric charge to, and charges, the surface of the photosensitive drum 11. The exposure device 603c forms and electrostatic latent image one the photosensitive drum 603a by irradiating light selectively onto the charged surface of the photosensitive drum 603a. As the exposure device 603c, an optical print head (19) may be used, for example.

The developing device 603d develops an image by attaching magenta (predetermined color) toner on the surface of the photosensitive drum 603, on which the electrostatic latent image has been formed, and is configured from the below-described toner cartridge. The cleaning device 603e removes a part of the toner remained on the photosensitive drum 603a after transferring the toner image on the photosensitive drum 603a. The drum and rollers used in each of these devices are rotated by the motive power transmitted from a drive source (not shown) via gears and the like.

A sheet cassette 606 with the recording medium 605, such as paper, stored therein is installed in the lower part of the image forming device 600. A hopping roller 607 for separating and carrying the recording medium 605 piece by piece is provided above the sheet cassette 606. Further, on the downstream side of the hopping roller 607 in a carrying direction of the recording medium 605, pinch rollers 608 and 609, a carrying roller 610 and a registration roller 611 are provided.

The carrying roller 610 carries the recording medium by pinching the recording medium 605 with the pinch roller 608. The registration roller 611 corrects oblique passage of the recording medium 605 and carries the sheet to the process unit 601 by pinching the recording medium 605 with the pinch roller 609. The hopping roller 607, the carrying roller 610 and the registration roller 611 are rotated by the motive power transmitted from a drive source (not shown) via gears and the like.

At a position opposing the photosensitive drum in the process units 601-604, a transfer roller 612 is provided that is formed from a semi-conductive rubber or the like. Electric charge is applied to each transfer roller 612 when transferring the toner image attached to the photosensitive drum 603a onto the recording medium 605, so that a potential difference is provided between surface potential of the photosensitive drums 601a-604a and surface potential of the transfer roller 612.

The fuser 613 includes a heating roller and a backup roller. The fuser 613 is a device to fix the toner transferred onto the recording medium 605 by pressure and heating. On the downstream side of the fuser 613, there are ejection rollers 614 and 615. The ejection rollers 614 and 615 pinch the recording medium 605 ejected from the fuser 28613 with the ejection part pinch rollers 614 and 615, respectively, and carry the recording medium 605 to a recording medium stacker 618. The fuser 613, the ejection roller 614 and the like are rotated by the motive power transmitted from the drive source (not shown) via gears and the like.

Next, the operation of the image forming device with the above-described configuration is explained. First, the recording media 605 stacked and stored in the sheet cassette 606 are carried piece by piece by the hopping roller 607. Then, each recording medium 605 is pinched by the carrying roller 610, the registration roller 611 and the pinch rollers 608 and 609 and is carried between the photosensitive drum 601a and the transfer roller 612 of the process unit 601. The recording medium 605 is sandwiched by the photosensitive drum 601a and the transfer roller 612 and is carried by the rotation of the photosensitive drum 601a while the toner image is transferred onto the recording surface of the recording medium.

The recording medium 605 sequentially passes through the process units 602-604 in the similar manner. During this process, the toner image in each color, which is the image of the electrostatic latent image formed by the respective one of the exposure devices 601c-604c and developed by the respective one of the developing devices 601d-604d, is sequentially transferred and superimposed on the recording surface of the recording medium 605.

Then, after the toner image in each color is superimposed on the recording surface of the recording sheet 605, the toner image is fixed on the recording sheet 605 by the fuser 613. Then, the recording medium 605 is pinched by the ejection rollers 614 and 615 and the pinch rollers 616 and 617, respectively, and is ejected to the recording medium stacker 618 outside the image forming device 600. A color image is formed on the recording medium 605 through these processes.

The explanation is made above with thyristors being the driven elements. However, the present embodiments are not limited to the thyristors. The embodiments may be implemented when the driven elements (101 and 102) are 3-terminal switching elements that include the first, second and third terminals and can control the current passage between the first and second terminals by voltage applied to the third terminal or current flowing to a control terminal. The anode, cathode and gate of the thyristors correspond to the first, second and third terminals of the 3-terminal switching element.

A case in which two adjacent thyristors form a group and in which the first set of thyristors and the second set of thyristors are formed by the odd-number thyristors and the even-number thyristors, respectively, is explained above. However, the number of the 3-terminal switching elements (e.g., thyristors) that form each group is not limited to two but may be three or more. The same number of sets is formed as the number of the 3-terminal switching elements (e.g., thyristors) that form each group. Each set is formed from the 3-terminal switching thyristors (e.g., thyristors) corresponding in different groups (thyristors located at the same order position from one end of the array in each group). In this case, the first terminals (A) of the plurality of 3-terminal switching elements belonging to the same group are connected to each other, and the third terminals (G) of the plurality of 3-terminal switching elements belonging to the respective set are connected to one of a plurality of common buses provided for the corresponding sets via an electric connection unit. The second terminals (K) of the 3-terminal switching elements are connected to ground. Each of a plurality of the first driving circuits is provided for corresponding one of the plurality of groups. The first driving circuits (e.g., anode driving circuits 119) are provided to drive the first terminals of the respective three-terminal switching elements. A plurality of the second driving circuits (e.g., gate driving circuits 401, 402, 501 and 502) is provided for the respective sets and drive the third terminals of the respective sets via the respective common buses (431 and 432) and electric connection means. The plurality of first driving parts (e.g., 119) drives the first terminals (A) of the plurality of 3-terminal switching elements belonging to the respective groups at mutually different timings. The plurality of second driving parts (e.g., 401) drive the third terminals (G) of the plurality of 3-terminal switching elements belonging to the respective sets at mutually different timings. Each of the plurality of second driving parts (401, 402) outputs the first potential (2V) in a period (period being S1N=Low), during which the third terminals of the 3-terminal switching elements belonging to the corresponding set are driven. Each of the plurality of second driving parts (401, 402) outputs the second potential (5V) that is different from the first potential (2V), in a period during which the third terminals of the 3-terminal switching elements belonging to the corresponding set are not driven (period being S1N=High), at the beginning of the timings at which the first terminals are driven by the first driving part. Each of the plurality of second driving parts (401, 402) outputs the third potential (3V) that is different from the first and second potentials, in the period during which the third terminals of the 3-terminal switching elements belonging to the corresponding set are not driven (period being S1N=High), at a time other than the beginning of the timings at which the first terminals are driven by the first driving part.

What is claimed is:

1. A driving circuit, comprising:
driven elements that form an array; and
a driving element array that drives the driven elements, wherein
the driven elements are 3-terminal switching elements that include first, second and third terminals and control current passage between the first and second terminals by one of voltage applied to the third terminal and electric current flowing to the third terminal,
the 3-terminal switching elements form a plurality of groups each being configured by a plurality of 3-terminal switching elements that are adjacently positioned,
the first terminals belonging to a same group of the 3-terminal switching elements are connected to each other,
a plurality of sets of the 3-terminal switching elements are respectively formed by corresponding ones of the 3-terminal switching elements belonging to different groups, and the third terminals of the 3-terminal switching elements belonging to a same set are connected to one of a plurality of common busses respectively provided for the plurality of sets via a respective electric connection unit,
the second terminals of the 3-switching elements are connected to ground,
the driving element array includes a plurality of first driving parts that are respectively provided to the plurality of groups and a plurality of second driving parts that are respectively provided to the plurality of sets,
each of the plurality of the first driving parts drives the respective first terminals of the 3-terminal switching elements belonging to a corresponding group at a first timing different from first timings for the other first driving parts,
each of the plurality of the second driving parts drives the respective third terminals of the 3-terminal switching elements of a corresponding set via a corresponding common bus and the corresponding electric connection unit, at a second timing different from second timings for the other second driving parts, and
each of the plurality of second driving parts outputs:
a first potential during a period to drive the respective third terminals of the 3-terminal switching elements belonging to the corresponding set,
a second potential that is different from the first potential, at a beginning of the first timings at which the first terminals of the 3-terminal switching elements belonging to the corresponding group are driven by the respective first driving parts, when the respective third terminals of the 3-terminal switching elements belonging to the corresponding sets are not driven, and
a third potential that is different from the first and second potentials, after the beginning of the first timings at which the first terminals of the 3-terminal switching elements belonging to the corresponding group are driven by the respective first driving parts, when the respective third terminals of the 3-terminal switching elements belonging to the corresponding sets are not driven.

2. The driving circuit of claim 1, wherein
the 3-terminal switching elements are thyristors,
the first terminals are anodes,
the second terminals are cathodes, and
the third terminals are gates.

3. The driving circuit of claim 2, wherein
a difference between the first and second potentials is larger than a difference between the first and third potentials.

4. The driving circuit of claim 2, wherein
the second potential is a value closer to a potential applied to the anodes at the beginning of the first timings at which the first driving parts drive the 3-terminal switching elements than the third potential.

5. The driving circuit of claim 1, wherein
the first driving parts each include a first switching element, a second switching element, a third switching element and an output terminal,
the first switching element controls current passage between the output terminal and ground,
the second and third elements control current passage between the output terminal and a power source,
when the 3-terminal switching elements in the respective sets are driven, the first switching element allows the current passage, and the second switching element stops the current passage,
when the 3-terminal switching elements in the respective sets are not driven, the first switching element stops the current passage, and the second switching element allows the current passage,
when the 3-terminal switching elements of the respective sets are not driven, at the beginning of the first timings at which the first terminals of the 3-terminal switching elements of the corresponding group are driven by the respective first driving parts, the third switching element allows the current passage, and
after the beginning of the first timings at which the first terminals of the 3-terminal switching elements of the corresponding group are driven by the respective first driving parts, the third switching element stops the current passage.

6. The driving circuit of claim 5, wherein
each of the second driving part receives a signal that indicates the first timings at which the first driving parts drive the 3-terminal switching elements,
the driving circuit further comprising a front edge detection circuit that generates a pulse that is maintained for a predetermined time after a start of the first timings at which the first driving parts drive the 3-terminal switching elements, and
the third switching element stops the current passage when the pulse is being generated by the front edge detection circuit and when the second driving parts do not drive the 3-terminal switching elements of the respective sets.

7. The driving circuit of claim 6, wherein
the first and third switching elements are PMOS transistors,
the second switching element is an NMOS transistor, and
the third switching element allows the current passage by applying ground potential to a gate of the PMOS transistor forming the third switching element.

8. The driving circuit of claim 1, wherein
the first driving parts each include a first switching element, a second switching element, a third switching element and an output terminal,
the first switching element controls current passage between the output terminal and ground,
the second element controls current passage between the output terminal and a first power source that has a first potential,
the third element controls current passage between the output terminal and a second power source that has a second potential,
when the 3-terminal switching elements in the respective sets are driven, the first switching element allows the current passage, and the second and third switching elements stop the current passage,
when the 3-terminal switching elements in the respective sets are not driven, the first switching element stops the current passage,
when the 3-terminal switching elements in the respective sets are not driven, at the beginning of the first timings at which the first terminals of the 3-terminal switching elements are driven by the first driving parts, the third switching element allows the current passage, and the second switching element stops the current passage, and
when the 3-terminal switching elements in the respective sets are not driven, after the beginning of the first timings at which the first terminals of the 3-terminal switching elements are driven by the first driving parts, the second switching element allows the current passage, and the third switching element stops the current passage.

9. The driving circuit of claim 8, wherein
each of the second driving parts receives a signal that indicates the first timings at which the first driving part drives the 3-terminal switching elements,
the driving circuit further comprising a front edge detection circuit that generates a pulse that is maintained for a predetermined time after a start of the timings at which the first driving parts drive the 3-terminal switching elements,
when the pulse is being generated by the front edge detection circuit when the second driving parts do not drive the 3-terminal switching elements of the respective sets, the third switching element stops the current passage, and the second switching elements stop the current passage.

10. The driving circuit of claim 6, wherein
the first, second and third switching elements are PMOS transistors, and
the first, second and third switching elements allow the current passage by applying a ground potential to gates of the PMOS transistors forming the first, second and third switching elements.

11. The driving circuit of claim 1, wherein
the 3-terminal switching elements are thyristors, and
the beginning of the first timings is a period corresponding to an initial period for anode current to rise, when the thyristors are turned on.

12. The driving circuit of claim 9, wherein
the pulse outputted from the front edge detection circuit is a positive pulse,
the third switching element is a PMOS transistor,
the driving circuit further comprising a NAND circuit that performs a NOT-OR operation between the plus and a signal that falls to a low level when the 3-terminal switching elements of the respective groups are driven by the first driving part and rises to a high level when the 3-terminal switching elements are not driven, and
an output of the NAND circuit is applied to a gate of the PMOS transistor forming the third switching element.

13. The driving circuit of claim 6, wherein
the pulse outputted from the front edge detection circuit is a positive pulse, and
the second and third switching element are PMOS transistors,
the driving circuit further comprising:
a first NAND circuit that performs a NOT-OR operation between a pulse and a set selection signal that falls to a low level when the 3-terminal switching elements of the corresponding group are driven by the first driving part and rises to a high level when the 3-terminal switching elements are not driven, and
a second NAND circuit that performs a NOT-OR operation between an inversion of the pulse and the set selection signal, an output of the first NAND circuit is applied to a gate of the PMOS transistor forming the third switching element, and an output of the second NAND circuit is applied to a gate of the PMOS transistor forming the second switching element.

14. The driving circuit of claim 1, wherein the 3-terminal switching elements are thyristors, the third potential is a potential that is low enough to turn on the thyristors when a driving voltage is applied to anodes of the thyristors, and the second potential is a potential that is high but insufficient to turn on the thyristors even when the driving voltage is applied to the anodes of the thyristors.

15. The driving circuit of claim 1, wherein a part of or all current at a rising part of a driving waveform at the first terminals becomes a driving current of the third terminals when the 3-terminal switching elements are driven.

16. The driving circuit of claim 1, wherein the plurality of sets comprises two sets, and a signal that indicates a period during which the third terminals of the 3-terminal switching elements of one of the two sets are driven and a signal that indicates the third terminals of the 3-terminal switching elements of the other one of the two sets are driven, are complementary with each other.

17. A driving device, comprising:

the driving circuit of claim 1;

a first circuit that generates a first driving signal for driving the first terminals of the 3-terminal switching elements of the plurality of groups;

a second circuit that generates a second driving signal for sequentially driving the 3-terminal switching elements of the plurality of sets, wherein a potential is applied to the first terminals of the 3-terminal switching elements based on the first driving signal, and the third terminals of the 3-terminal switching elements are driven based on the second driving signal.

18. An image forming device, comprising:

the driving device of claim 17, wherein the driven elements comprise light emitting thyristors, and the light emitting thyristors are used as light emitting elements for an optical print head for an electrographic process.

19. A driving circuit, comprising:

a plurality of 3-terminal switching elements that form an array, the 3-terminal switching elements each including first, second and third terminals, the first terminal being connected to a signal line, the second terminal being connected to ground, the third terminal being connected to a common bus, a plurality of groups of the 3-terminal switching elements being formed by adjacent ones of the 3-terminal switching elements, a plurality of sets of the 3-terminal switching elements being formed by corresponding ones of the 3-terminal switching elements in different groups;

a plurality of signal lines that respectively connect the first terminals of each of the plurality of groups of the 3-terminal switching elements;

a plurality of common buses are that respectively connected to the third terminals of the 3-terminal switching elements of each of the plurality of sets; and a driving element array that drives the 3-terminal switching elements, the driving element array including a plurality of first driving parts respectively provided to the plurality of groups, and a plurality of second driving parts respectively provided to the plurality of sets, the first driving parts driving the respective first terminals of the 3-terminal switching elements of the groups at first timings, and the second driving parts driving the respective third terminals of the 3-terminal switching elements of the respective set via the corresponding common bus, at second timings, the first timings of the first driving elements being different from each other, the second timings of the second driving elements being different from each other, wherein each of the plurality of second driving parts outputs:

a first potential in a period to drive the third terminals of the 3-terminal switching elements of the corresponding set, a second potential that is different from the first potential, at a beginning of the first timings at which the first terminals are driven by the first driving parts, when the respective third terminals of the 3-terminal switching elements of the corresponding set are not driven, and a third potential that is different from the first and second potentials, after the beginning of the first timings at which the first terminals are driven by the first driving parts, when the respective third terminals of the 3-terminal switching elements of the corresponding sets are not driven.

* * * * *